(12) United States Patent  
Davidson et al.

(10) Patent No.: US 9,026,694 B1
(45) Date of Patent: May 5, 2015

(54) TECHNIQUES FOR WORKLOAD REDISTIBUTION

(71) Applicant: EMC Corporation, Hopkinton, MA (US)

(72) Inventors: James L. Davidson, Tyngsboro, MA (US); Alexandr Veprinsky, Brookline, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 65 days.

(21) Appl. No.: 13/925,216

(22) Filed: Jun. 24, 2013

(51) Int. Cl.
  *G06F 3/00* (2006.01)
  *G06F 9/50* (2006.01)

(52) U.S. Cl.
  CPC ..................................... *G06F 9/505* (2013.01)

(58) Field of Classification Search
  None
  See application file for complete search history.

(56) References Cited

U.S. PATENT DOCUMENTS

| 8,316,161 | B1 | 11/2012 | Contreras et al. |
| 8,370,592 | B1 | 2/2013 | Specht et al. |
| 8,428,070 | B2 * | 4/2013 | Ichiki et al. ................... 370/396 |
| 2010/0191876 | A1 * | 7/2010 | Muppirala et al. .............. 710/39 |

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Described are techniques for redistributing workload. A first port, from which a first workload is to be redistributed, is selected. A second port, having available capacity to perform additional workload, is selected. A device, accessible over both the first port and the second port, is selected. Each of one or more paths including the first port is set to a passive state for the device. Each of the one or more paths having the passive state for the device indicates to a client that sends I/O operations to the device that said each path is not to be used for sending I/O operations to said device and that said each path is available for use in performing control operations directed to the device.

20 Claims, 19 Drawing Sheets

| bit→<br>↓byte | 7 | 6 | 5 | 4 | 3 | 2 | 1 | 0 |
|---|---|---|---|---|---|---|---|---|
| 0 | Peripheral qualifier | | | | Peripheral device type | | | |
| 1 | RMB | Device-type modifier | | | | | | |
| 2 | ISO version | | ECMA version | | | ANSI-approved version | | |
| 3 | AEC | TrmIOP | Reserved | | Response data format | | | |
| 4 | Additional length (N-4) | | | | | | | |
| 5 | Reserved | | | | | | | |
| 6 | Reserved | | | | | | | |
| 7 | RelAdr | WBus32 | WBus16 | Sync | Linked | Reserved | CmdQue | SftRe |
| 8–15 | Vendor identification (ASCII) | | | | | | | |
| 16–31 | Product identification (ASCII) | | | | | | | |
| 32–35 | Product revision level | | | | | | | |
| 36–55 | Vendor-specific | | | | | | | |
| 56–95 | Reserved | | | | | | | |
| 96..N | Vendor-specific parameters (variable number of bytes) | | | | | | | |

FIGURE 7

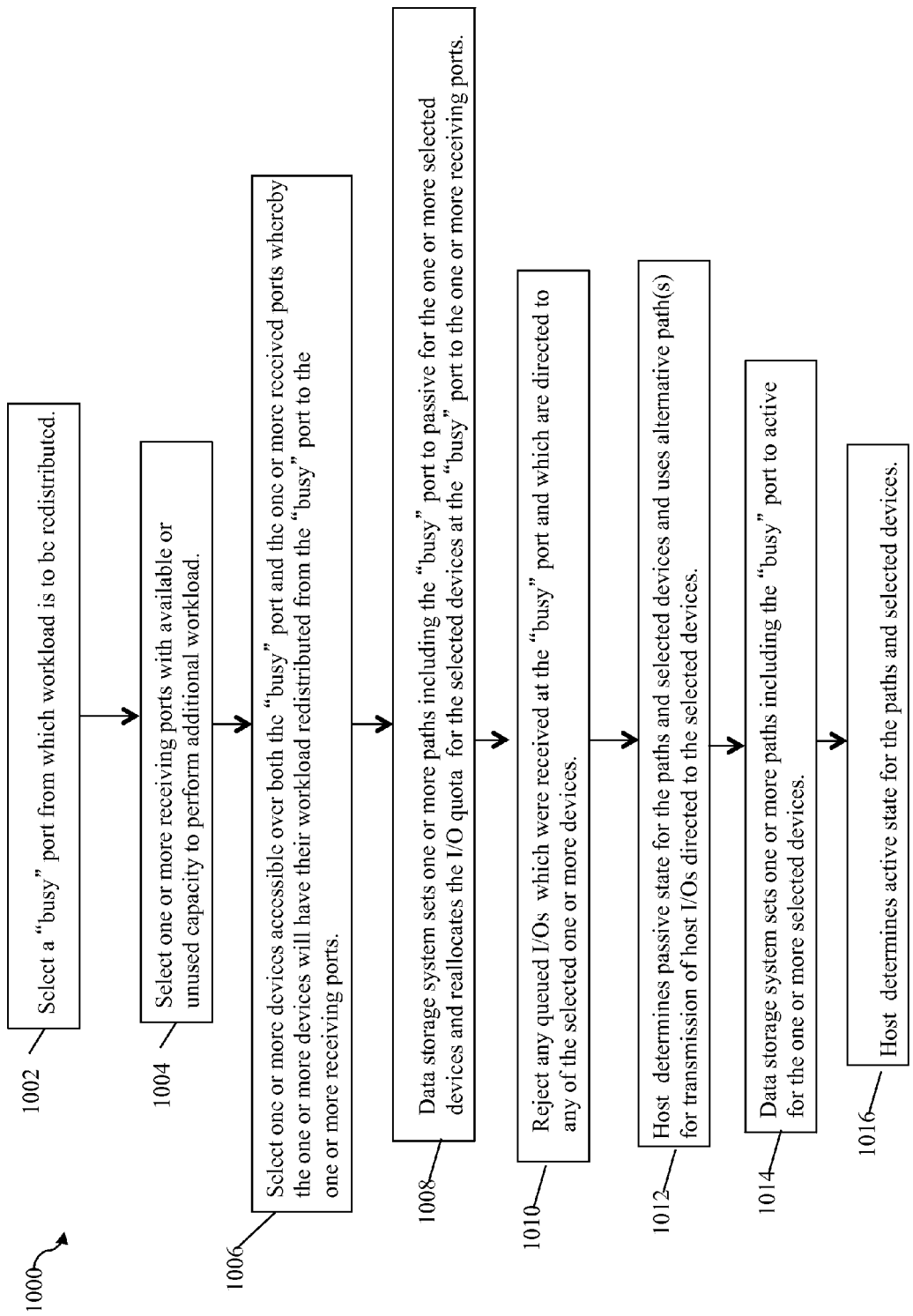

TECHNIQUES FOR WORKLOAD REDISTIBUTION

BACKGROUND

1. Technical Field

This application generally relates to data storage systems, and more particularly to techniques for redistributing I/O workload among front end ports of a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such for path selection and management of the multiple paths, may be handled by a device driver. When the host issues an I/O operation, it may be received by a device driver which facilitates sending and/or receiving transmissions between the application and the data storage system.

SUMMARY OF THE INVENTION

In accordance with one aspect of the invention is a method for redistributing workload comprising: selecting a first port from which a first workload is to be redistributed; selecting a second port with available capacity to perform additional workload; selecting a device accessible over both the first port and the second port; and setting each of one or more paths including the first port to a passive state for the device, wherein each of the one or more paths having the passive state for the device indicates to a client that sends I/O operations to the device that said each path is not to be used for sending I/O operations to the device and that said each path is available for use in performing control operations directed to the device. The first port, the second port, and the device may be included in a data storage system. The device may be accessible by a first host over a first path including the first port, and the device may be accessible by the first host over a second path including the second port. The first port may be selected in accordance with one or more criteria. The one or more criteria may include any one or more of: whether an actual workload received at the first port for a time period exceeds a maximum capacity denoting a maximum workload capability of the first port, and whether an average pending I/O queue depth for all I/Os directed to the first port exceeds a threshold queue depth. The actual workload and the maximum capacity of the first port may be expressed using any of a number of I/Os per unit of time and an amount of storage transmitted per unit of time. Each device accessible through the first port may have a pending I/O queue of I/Os whereby each I/O included in the pending I/O queue has been received at the first port, is directed to said each device and is waiting to be serviced. The device may be selected in accordance with one or more criteria including any one or more of: whether an average pending I/O queue depth of pending I/Os received at the first port directed to the device is a largest such average queue depth with respect all pending I/O queues for devices accessible over the first port, and whether an actual workload received at the first port for a time period directed to the device is greater than any other actual workload that is received at the first port for a time period and directed to any other device accessible over the first port. A first plurality of devices may be accessible to a host over the first port. The first plurality of devices may be associated with a plurality of quotas, a different one of the plurality of quotas being specified for each of the first plurality of devices, whereby each of the plurality of quotas specified for a one of the first plurality of devices may denote an upper bound of actual workload allowable for the one device through the first port. A first sum may be determined that is a sum of the plurality of quotas, and wherein the first sum may exceed a first maximum capacity denoting a maximum workload capability of the first port. A first actual workload received at the first port for a time period may exceed a maximum capacity denoting a maximum workload capability of the first port. A first portion of the first actual workload representing an actual workload received at the first port directed to the device may not exceed one of the plurality of quotas specified for the device. An actual workload for the second port may not exceed a second maximum capacity denoting a maximum workload capability of the second port. A host may determine that a first of the one or more paths including the first port is set to the passive state for the device, and, responsive to determining that the first path is in the passive state for the device, the host may send one or more I/Os directed to the device over another path including the second port. A data storage system may include the first port, the second port and the device, and the method may further comprise: sending, by the host to the data storage system, a first I/O to the device over the first path; and sending, by the data storage system to the host, a response to the first I/O denoting that the first I/O failed and will not be serviced. The available capacity of the second port may be at least a minimum amount. A first I/O directed to the device may be received at the first port prior to performing the setting when each of the one or more paths is in an active state with respect to the device thereby denoting that I/Os received on said each path which are directed to the device will be serviced. The first I/O is placed in a pending I/O queue associated with the device because the first actual workload received at the first port for a time period exceeds the maximum capacity denoting the maximum workload capability of the first port.

In accordance with another aspect of the invention is a computer readable medium comprising code stored thereon for redistributing workload, the computer readable medium comprising code for: selecting a first port from which a first workload is to be redistributed; selecting a second port with available capacity to perform additional workload; selecting a device accessible over both the first port and the second port; and setting each of one or more paths including the first port to a passive state for the device, wherein each of the one or more paths having the passive state for the device indicates to a client that sends I/O operations to the device that said each path is not to be used for sending I/O operations to the device and that said each path is available for use in performing control operations directed to the device.

In accordance with yet another aspect of the invention is a system comprising a host and a data storage system. The data storage system includes a first port from which a first workload is to be redistributed; a second port with available capacity to perform additional workload; a device accessible to the host over both the first port and the second port; and wherein the data storage system includes a processor which is programmed to perform processing including: setting each of one or more paths including the first port to a passive state for the device, wherein each of the one or more paths having the passive state for the device indicates to the host that sends I/O operations to the device that said each path is not to be used for sending I/O operations to the device and that said each path is available for use in performing control operations directed to the device. The first port may be selected in accordance with one or more criteria. The one or more criteria may include any one or more of: whether an actual workload received at the first port for a time period exceeds a maximum capacity denoting a maximum workload capability of the first port, and whether an average pending I/O queue depth for all I/Os directed to the first port exceeds a threshold queue depth. The actual workload and the maximum capacity of the first port may be expressed using any of a number of I/Os per unit of time and an amount of storage transmitted per unit of time. Each device accessible through the first port may have a pending I/O queue of I/Os whereby each I/O included in the pending I/O queue has been received at the first port, is directed to said each device and is waiting to be serviced.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5, 6, 7, and 8 are examples illustrating messages that may be exchanged between a host and data storage system in an embodiment in accordance with techniques herein;

FIGS. 10 and 18 are flowcharts of processing steps that may be performed in an embodiment in accordance with techniques herein;

DETAILED DESCRIPTION OF EMBODIMENT(S)

Figure 1:
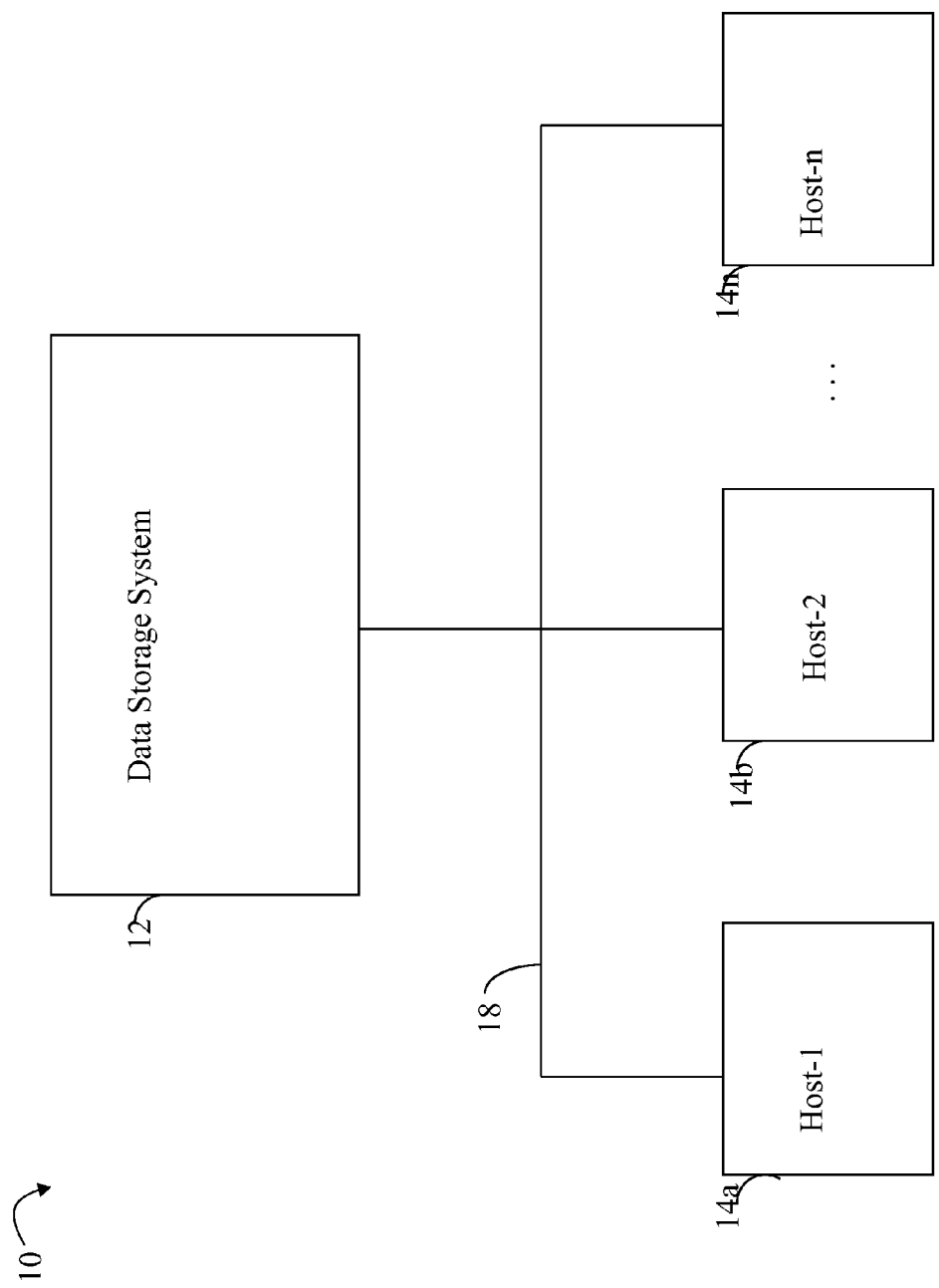
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with the embodiment.

Figure 2A:
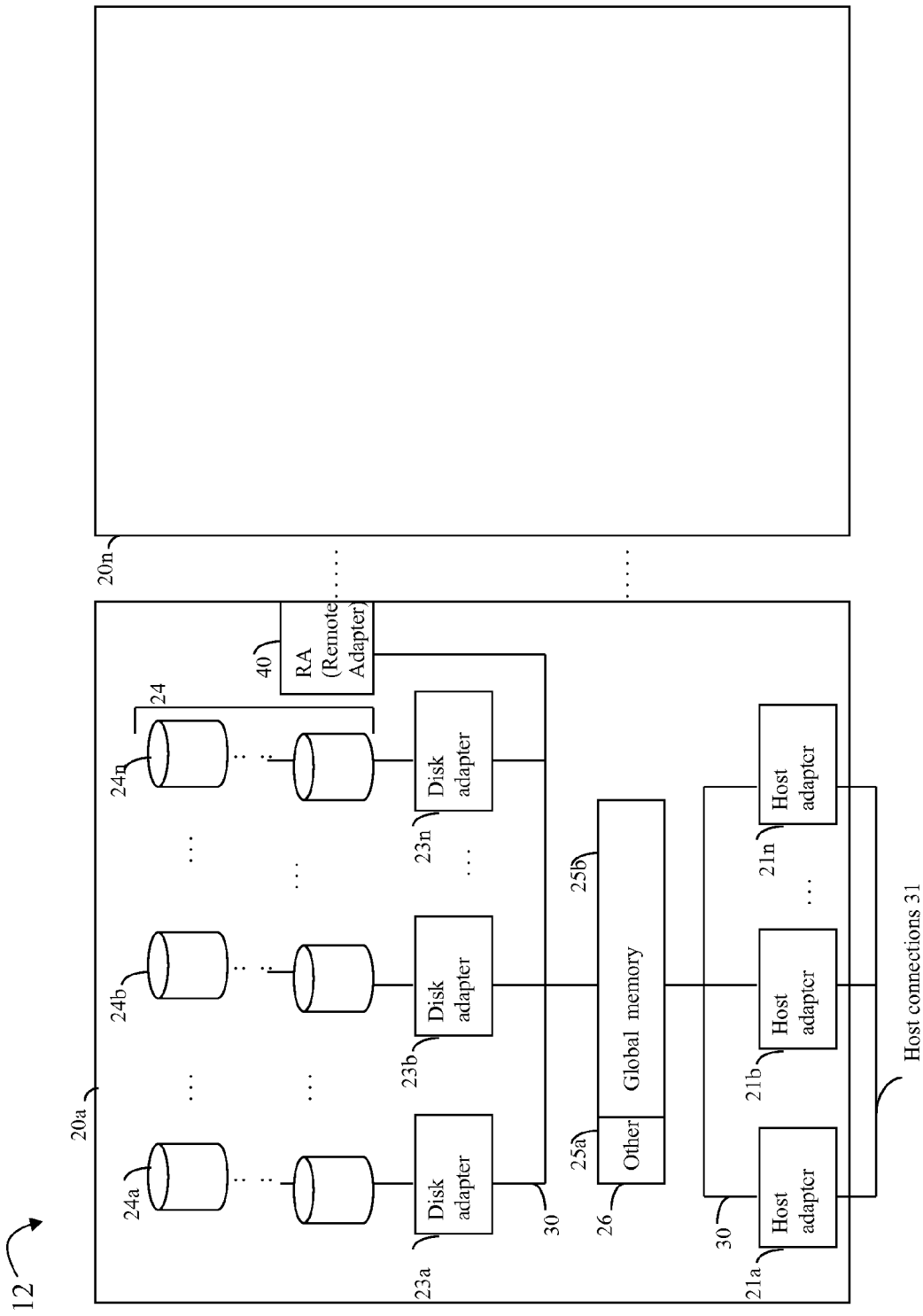
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
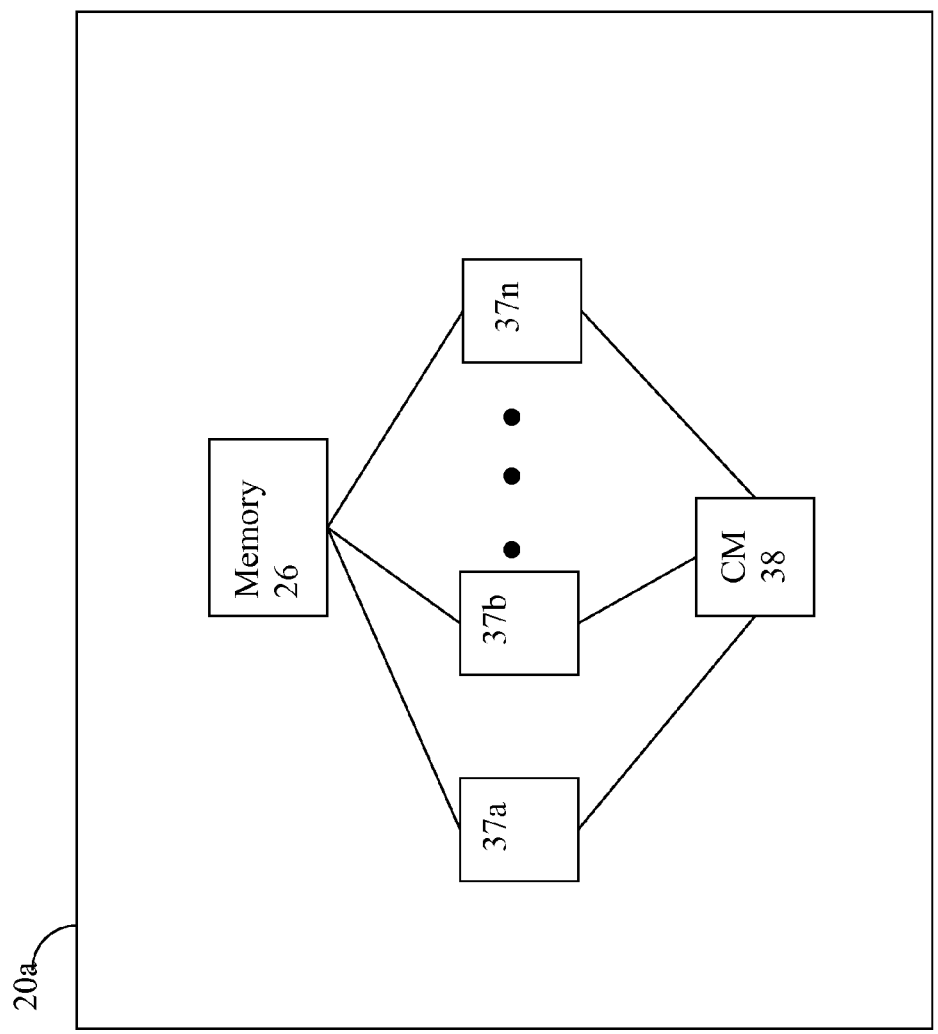
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Figure 3:
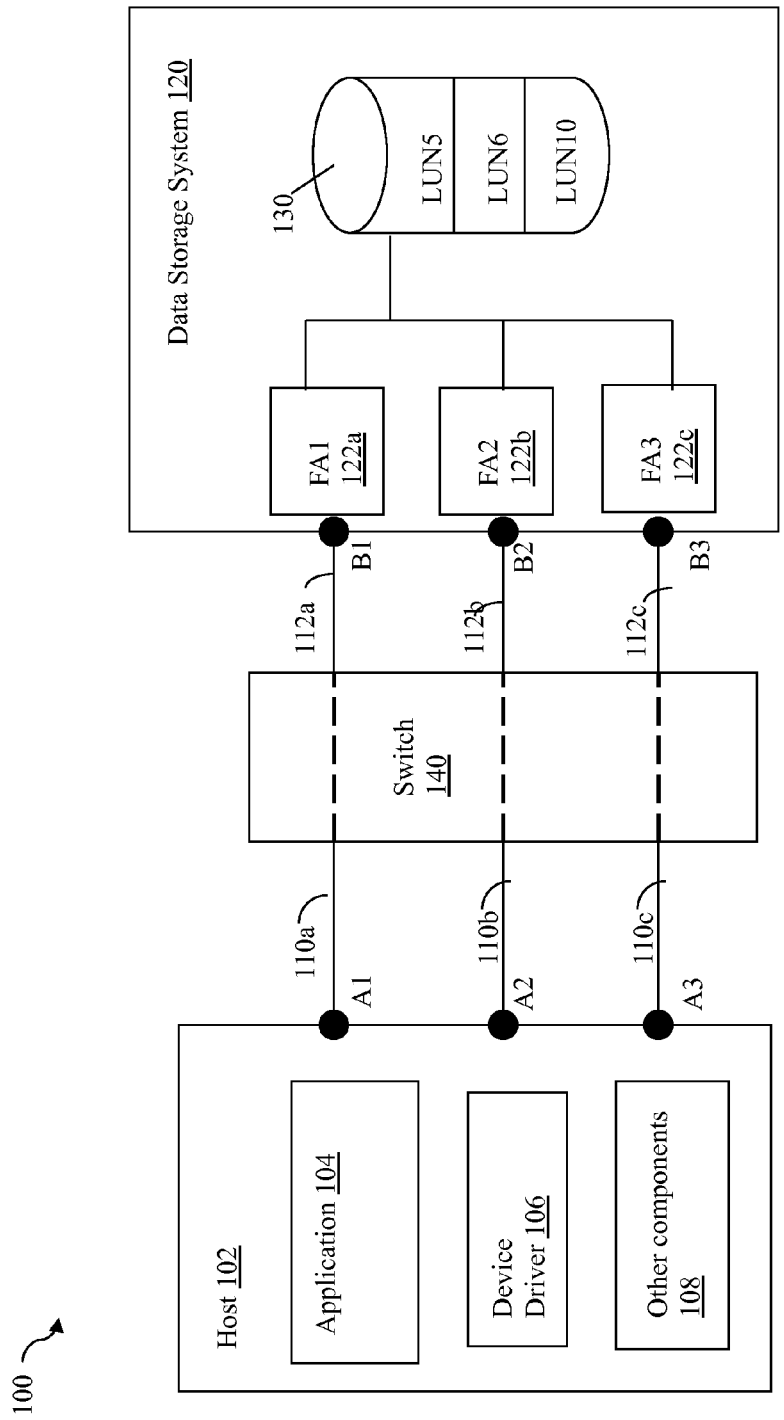
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs-LUN5, LUN6 and LUN10. It should be noted that the example 100 includes only a single host, single data storage system, and a fabric including a single switch for purposes of simplicity to illustrate the techniques herein.

The host 102 may include an application 104, driver 106 and other components 108. An I/O operation from the application 104 may be communicated to the data storage system 120 using the driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The driver 106 may include functionality to perform any one or more different types of processing such as related to encryption, multipathing, mirroring, migration, and the like. For example, the driver 106 may include multipathing functionality for management and use of multiple paths. For example, the driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The driver 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the driver 106 and also below the driver 106. For example, application 104 may issue an I/O operation which is communicated in a call stack including an LVM, the driver 106, and an FC or SCSI driver.

The data storage system 120 may include one or more physical data storage devices, such as device 130, where each such device is configured into one or more LUNs as described above. Each of the LUNs of the device 130 may be configured to be accessible to the host through multiple paths. For example, all LUNs of 130 may be accessible using ports of the three front end directors or interfaces 122a-122c, also denoted respectively FA1, FA2 and FA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the driver 106 may also perform other processing in addition to load balancing in connection with path selection. The driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. Each of the LUNs of the device 130 may be accessible over three paths—a first path represented by A1-B1, a second path represented by A2-B2 and a third path represented by A3-B3.

Although the techniques herein may be used in an embodiment in which the driver resides on a host and manages data storage devices on a data storage system, the driver may also manage data storage devices that are directly attached to the host.

It should be noted that each of the HBAs of a host as well as each FA of a data storage system may include a single port. However, an embodiment may use other components having more than a single port.

Figure 4:
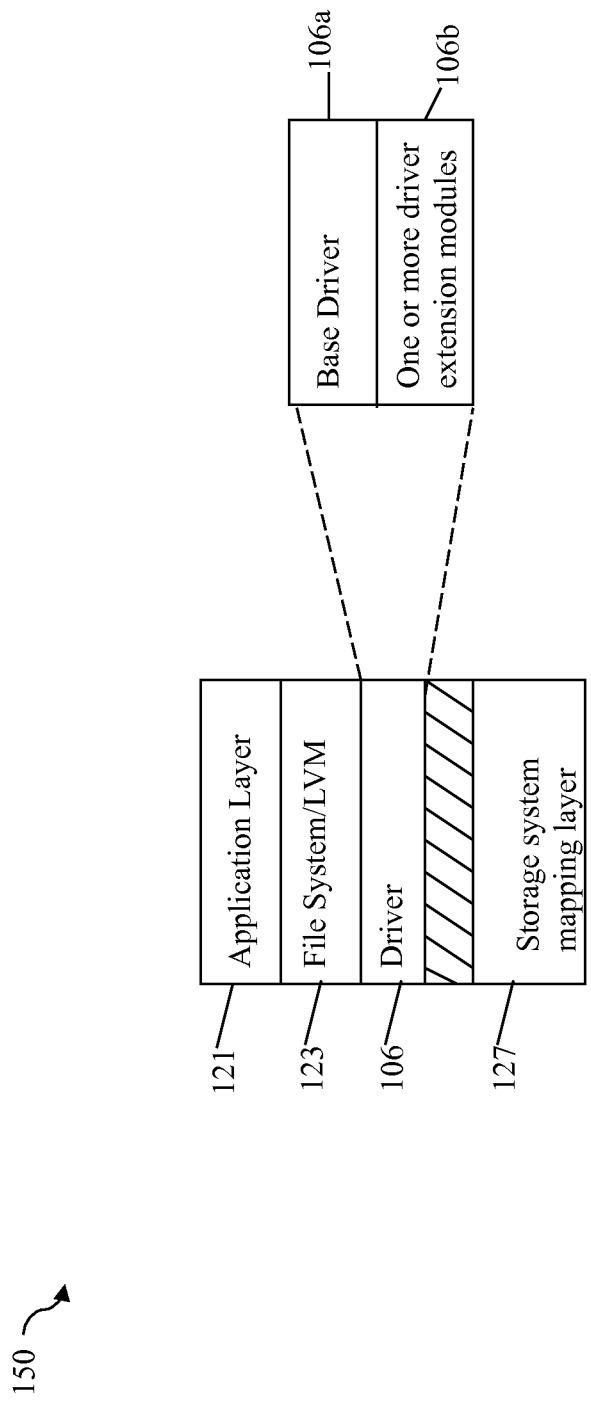
FIG. 4 is an example of different software layers that may included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the driver 106 of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to a LUN which the host may perceive as corresponding to a physical device address (e.g., the address of one of the disk drives) within the storage system 12. Below the file system/LVM layer 123 is the driver 106 which handles processing of the I/O received from layer 123. The driver 106 may include a base driver 106a and one or more driver extension modules 106b. The driver 106 may be included in a commercially available product such as EMC® PowerPath® software. Functionality for performing multipathing operations such as may be performed by EMC® PowerPath® software may be included in one of the extension modules 106b such as a multipath (MP) extension module. As described above, the MP extension module may perform processing in connection with multiple path management and selecting one of a plurality of possible paths for use in connection with processing I/O operations and communicating with the data storage system, such as 120 of FIG. 3. The layer 123 may provide for mapping a LUN as presented by the data storage system to the host to another logical data storage entity that may be used by the application layer 123.

In some embodiments, the data storage system 120 may be an intelligent data storage system having its own mapping layer 127 such that the LUN passed from the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may executed in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices, such as LUNs of the data storage system. Such I/O operations may be directed to the driver 106 after passing through any intervening layers such as layer 123.

In connection with an embodiment in accordance with techniques herein, communications between an initiator port of the host and a target port of a data storage system may include those related to I/O operations and others related to host control operations. I/O operations may include, for example, read and write operations. Host control operations may include those commands which are not performing I/O with respect to a data storage device (e.g., LUN) and include SCSI command such as, for example, inquiry, mode sense, and read capacity.

In following paragraphs, described are techniques that may be used in connection with indicating a state of a path for a particular device. Using such techniques, a path may have an associated state referred to as passive or inactive indicating that the path is not in use or available for I/O operations directed to that particular device. When a path is in such a state, the path may not be used for sending I/O operations directed to that device. When the path is in the passive state, the data storage system including the device may return an error status indicating a failure for any I/O operations which are sent over the path and directed to the device. However, the same path may be successfully used for I/O operations directed to other devices and the device may be accessible through one or more other paths. The passive state may be communicated by the data storage system, such as a data storage array including the device, to a host, or more generally, an initiator using techniques herein. The passive state may indicate that the data storage system is currently not accepting I/O operations for the device on that particular path. When in this passive state, the device and path (including components such as ports, physical connections, and the like) are healthy and operable. However, the data storage system is indicating via this passive state restricted usage of a particular path with respect to I/O operations directed to the device. Thus, the state of passive with respect to the path and device may be communicated by the data storage system to the host, or component thereon such as the driver, by returning a defined set of one or more responses to particular commands or requests allowing the host to detect the passive state for the device and path combination. An active state with respect to a path and a device may refer to the state when a path is used for sending I/O operations to the device. A path for a device may transition between active and passive states, as well as possibly other optional states that may be included in an embodiment. When in the passive state with respect to a particular path and LUN combination, the path may be designated as inactive or not available for sending I/O operations to the LUN. When a path is in the passive state with respect to a particular LUN, the path may be indicated as available only for use in performing host control operations (e.g., inquiry, mode sense, read capacity, etc.) directed to the LUN. If an I/O operation is received over a path for a LUN and the path and LUN combination is in the passive state, the data storage system responds with an error message (e.g., responds with a check condition status code) and does not perform the requested I/O operation. When a path is in the active state with respect to a particular LUN, the path may be used to perform host read/write I/O operations (e.g., SCSI read or write operations to access host data) as well as host control operations (e.g., respond to inquiry and mode sense SCSI commands from the hosts).

Prior to discussing the techniques for representing and communicating the passive status for a device and path combination, following paragraphs will first provide a general discussion of some elements used in connection with such techniques.

In connection with the SCSI protocol and standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another FA having a port with a network address) characterized as a target, destination, receiver, or responder. Each physical connection of a path may be between a first endpoint which is a port of the host (e.g., such as of a host bus adapter) and a second endpoint which is a port of an FA in the data storage system.

Initially, a data storage system may be configured for use by one or more hosts. Part of this configuration processing includes defining what LUNs of the data storage system are accessible or visible to the host over which one or more paths. Discovery processing may then be performed by the host to discover all LUNs accessible to the host and over what one or more paths. As part of discovery processing, the host may issue commands to the data storage system to discover what LUNs are visible to the host over what one or more paths, discover information about each LUN, and the like. For example, the host may issue a first command from a host initiator port (e.g., Report LUNs) to obtain a list of all LUNs visible from the host initiator port. Subsequently, the host may also send a sequence of one or more commands to each LUN from the host initiator port to gather additional information about the LUN and path, perform a path test to determine whether a LUN is currently accessible to the host over the path such as for I/O operations, and the like. For example, the host as initiator may send the following sequence of SCSI commands over a path, such as from a host port to a target data storage system port, as part of discovery processing:

1. Test unit ready (TUR)
2. Standard Inquiry page 0
3. read capacity
4. mode sense
5. Inquiry VPD page 0x83

In the foregoing command sequence, TUR provides a means to check if the logical unit is ready, mode sense reports information about the LUN to the initiator, read capacity obtains storage capacity information about the LUN, and the standard inquiry page 0 provides general information about the LUN and also serves as a path test to determine whether the LUN is accessible to the host over the path from the host initiator port to the data storage system target port. With the standard inquiry page 0 command, the page field of the SCSI command data block is set to 0 and the EVPD field of the SCSI command data block is set 0 to return a standard set of data as described in more detail elsewhere herein. Inquiry VPD (Vital Product Data) page 0x83 may also be used in a manner similar to the standard inquiry page 0 command (e.g., denoted in 2 above) to obtain information about the LUN. With the inquiry VPD page 0x83 command, the page field of the SCSI command data block is set to 0x83 and the EVPD field of the SCSI command data block is set 1. More generally, the foregoing command sequence illustrates an exemplary sequence performed in an embodiment as part of discovery processing to recognize or establish a path over which a LUN may be accessed. After the foregoing has been successfully executed, the path may be characterized as a recognized path by the host over which to access the LUN. The foregoing sequence of 5 instructions represents one sequence of commands that may be expected to be completed successfully in order for a path to be considered recognized or established.

In an embodiment in accordance with techniques herein, an additional one or more commands may also be included in the expected command sequence of instructions as part of path recognition. The additional commands may be in accordance with processing performed by the driver including multipathing functionality as described herein. For example, the driver may issue commands in connection with SCSI reservation protocol exchanges. In this case, path recognition for a particular device may also include successfully executing a SCSI reservation registration command. The reservation registration command may be used by the host to register for subsequent reservations on a particular path for a device where the path may be used to subsequently send commands to the device over the path. In connection with techniques herein as described in more detail elsewhere, after the host successfully executes the reservation registration command in the embodiment using the multipath functionality, this may be an indication to the data storage system that the host has recognized the associated path. Subsequently, the data storage system may perform processing as needed in accordance with techniques herein to indicate that the path for the particular LUN is in a passive state.

As will be described in more detail below, it should be noted that, more generally, an embodiment in accordance with techniques herein may be used in connection with any sequence of commands which, when executed successfully, indicate that a path is recognized or established by the host for use in accessing the LUN.

Subsequent to recognizing a LUN as accessible over a path, a problem may occur with the path such as a problem with a physical wiring or network connection, host bus adapter or initiator port of the host, and the like, so that the path is inoperable and fails a path test. The path test may be issued in connection with the standard inquiry page 0 and/or other commands. At this point, the host may store information indicating that the path has a bad or failing status reflecting the inability to access the LUN and possibly other LUNs. At a later point, the host may again perform a path test over the path to determine whether the problem of the path has been corrected. If so, the host may accordingly update information about the path to indicate the path as having a good status and may be used in connection with I/Os and other operations for the LUN. Thus, in an embodiment in accordance with techniques herein as described in more detail below, once the path with respect to accessing a particular LUN has been recognized, the host may detect at a later point in time that the path has failed in any one or more different ways and is unable to be used in connection with transmissions to the LUN. Subsequently, the host may then perform processing to automatically retry the path for sending communications to the LUN.

In connection with multiple paths as may be managed and used by the MP driver module described above, techniques may be performed to allow the MP module to determine whether two paths are providing accessibility to the same or different LUNs. For example, a host may use the SCSI standard inquiry page 0 command for this purpose. One of the items returned in response to such a command is information that may be used as a device identifier associated with a particular LUN for which the command was issued. The foregoing device identifier associated with the LUN may be used to uniquely identify the LUN. It should be noted that the level of uniqueness is with respect to all LUNs that may be used by the host across multiple data storage systems, such as multiple data storage arrays and other systems. Therefore, consider the example where the host issues a standard inquiry page 0 command over path 1 to a LUN and receives in the return payload a first device identifier. The host then issues a second standard inquiry page 0 command over path 2 to a LUN and receives in the return payload a second device identifier. If both the first and second device identifiers are the same, then both path 1 and path 2 are accessing the same LUN (e.g., providing access to the LUN over different paths).

Figure 5:
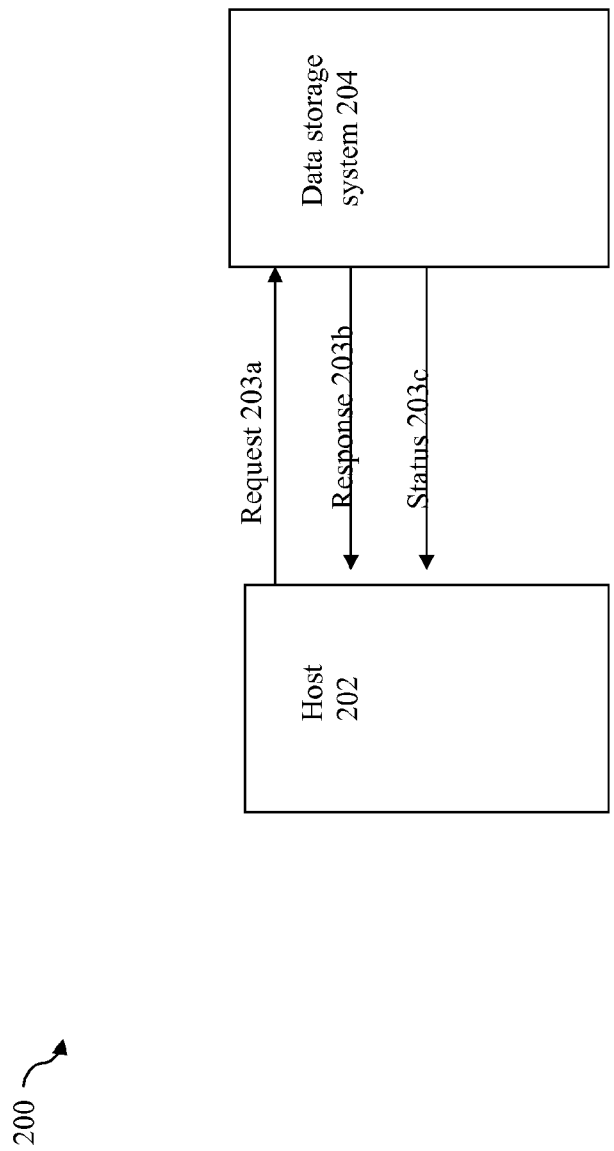

Referring to FIG. 5, shown is an example of messages as may be exchanged between a host and data storage system in an embodiment in accordance with techniques herein. The example 200 illustrates messages exchanged between the host 202 and data storage system 204 in connection with a SCSI inquiry command issued by the host and represented by 203a. In response to the inquiry command, the data storage system 204 may send a response 203b and a status message 203c.

Figure 6:
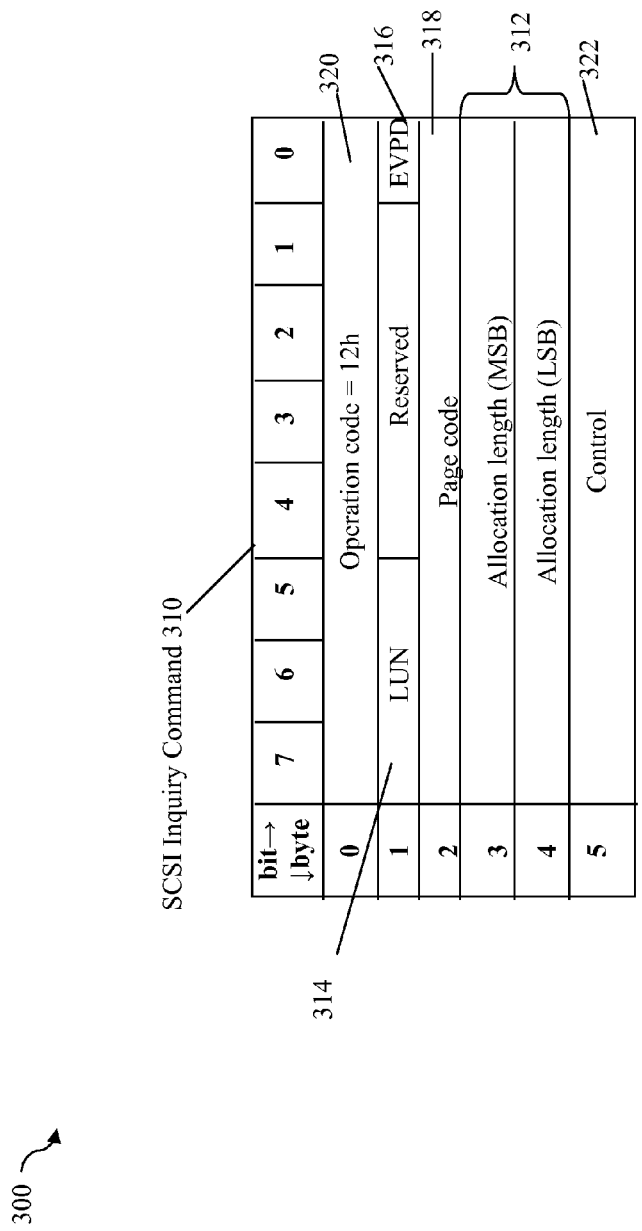

Referring to FIG. 6, shown is an example of a command data block or payload of a SCSI command as may be used in an embodiment in accordance with techniques herein. The SCSI inquiry command 310 may include data in accordance with the illustrated format. A message in accordance with format 310 may be sent by the host to the data storage system as illustrated by 203a of FIG. 5. The command 310 may specify the following fields: operation code 320 (e.g. indicating the inquiry command code), a LUN 314, EVPD (e.g., vital product data) indicator 316, page code 318, allocation length 312, and control 322. The format of 310 is in accordance with the SCSI standard. The standard page 0 inquiry command as described herein has the page code field 318 set to 0 and the EVPD field 316=0. A standard page 0 inquiry command may be sent as part of the sequence of instructions mentioned above for path recognition. The allocation length fields 312 specify an upper bound or maximum size of the response payload that may be returned by the data storage system as described in more detail below. In connection with 312, MSB denotes the most significant byte of the allocation length and LSB denotes the least significant byte of the allocation length. The EVPD field 316 in combination with the page code field 318 identify the type and amount of information that is returned in the response. Additionally, certain portions of the format are indicated as reserved in accordance with the SCSI standard. As will be appreciated by those skilled in the art, suitable data for the other fields may be specified even though not discussed in detail herein.

Referring to FIG. 7, shown is an example of a data format of a response to the inquiry command as may be used in an embodiment in accordance with techniques herein. The example 350 illustrates a format in accordance with the SCSI standard for the payload portion of a response message. A message in accordance with format 352 may be returned to the host as illustrated by 203b of FIG. 5. As represented by the variable byte offset field indicators 351, the size of the response payload to the inquiry command may vary depending on the length of the vendor specific parameters field 356. Element 351 denotes the field 356 as having a last byte located at any offset from 96 to N (e.g., field 356 may be 1 or more bytes). As described above in connection with FIG. 6, the inquiry command may specify an allocation length 312 indicating a maximum size of the payload of the response (e.g., the maximum size of the data returned having format 352). The response 352 may include the additional length field 354 that specifies the actual length in bytes of the parameters or following data. Thus, field 354 indicates the actual size of the response payload following field 354. The value indicated by field 354+4 bytes should not exceed the maximum size specified by the allocation length 312 of FIG. 6 in an embodiment denoting byte locations or offsets which are zero-based.

In one embodiment, the device identifier for a LUN as may be used to uniquely identify the LUN among all LUNs in all data storage systems used by the host may be specified using information in the vendor specific parameters field 356. Field 356 may be a variable length in accordance with the amount of information supplied by the particular data storage system vendor. The field 356 may include, for example, a data storage system identifier, such as a data storage system serial number, and a device number. The serial number may be, for example, a 5 byte field and include a serial number of the data storage array or other type of data storage system in which the LUN identified is included. The device number may be, for example, a 4 byte field. The data storage system serial number in combination with the device number may be used to form the device identifier for the LUN. An embodiment may use all, or portions of the foregoing serial number and device identifier, in forming the device identifier. For example, an embodiment may concatenate the two items to form the device identifier, concatenate or otherwise use one or more bytes or bits of each to form the device identifier (e.g., low 2 bytes of serial number (in ASCII), low 3 hex digits of device number (in ASCII), two most significant digits of serial number (in binary coded decimal). More generally, an embodiment may use any suitable information and technique to uniquely identify and distinguish between LUNs. For example, a random number may be generated and used as the device identifier. It should also be noted that the information used to determine the device identifier may be included in one or more other fields of the response 352. For example, a portion of the serial number and/or device number may be stored in the vendor-specific field 358 and used alone, or in combination with other information to determine the device identifier. As will be appreciated by those skilled in the art, suitable data for the other fields of 352 may be specified even though not discussed in detail herein.

Figure 8:
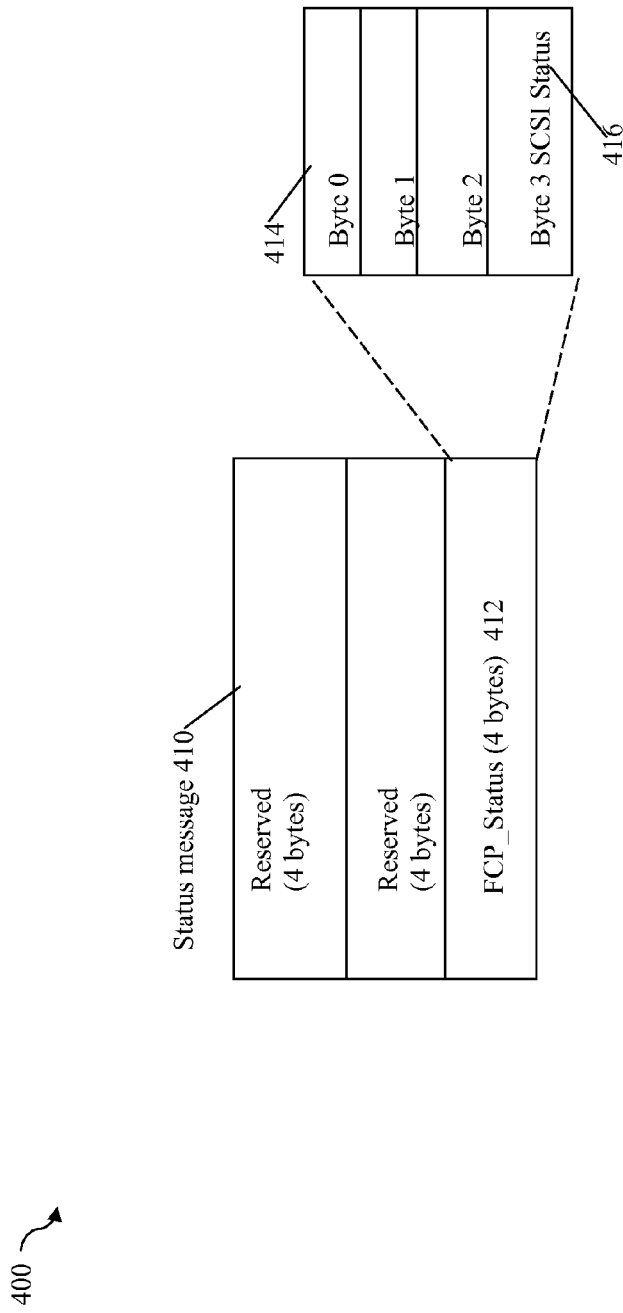

Referring to FIG. 8, shown is an example of a data format of a status message payload sent in response to the inquiry command as may be used in an embodiment in accordance with techniques herein. The example 400 illustrates a format in accordance with the SCSI standard for the payload portion of a status message. A message in accordance with format 410 may be returned to the host as illustrated by 203c of FIG. 5. The status message 410 includes 8 reserved bytes followed by a 4 byte FCP Status field 412 indicating the status of the inquiry command execution at the data storage system for the requested LUN. Element 414 provides additional detail regarding the field 412 and indicates that the last byte thereof, field 416, indicates the status of the inquiry command execution. In accordance with the SCSI standard, the only acceptable value for the SCSI status field 416 when returning an inquiry response payload is a good status indicating that the data storage system has successfully completed the inquiry command. Although the SCSI standard defines other status codes and states (e.g., check condition indicating that the requested command was not successfully executed (e.g an error occurred when executing the command or that the command was not executed), busy indicating that the device cannot accept commands right now, and the like), returning any other status indicator besides good (e.g., value 00 in hex) when returning an inquiry response payload is not in accordance with the standard. Thus, a data storage system which is in compliance with the SCSI standard and returns an inquiry response payload and status message in response to the inquiry command only returns a good status indicator in the status message.

Furthermore, it should be noted that the SCSI standard defines only three instances where a status of "check condition" may be returned in response to an inquiry command. In these three cases, no response payload is returned. As noted elsewhere herein, check condition is one of the defined status codes that may be returned in accordance with the SCSCI standard. In these three instances, check condition indicates that the inquiry command has not been executed. The foregoing three instances may be summarized as follows.

1. When the inquiry command data block has the page code field set to a value other than zero and the EVPD bit is set to zero (e.g. has an invalid combination of settings for the page code field and EVPD field), the inquiry command is terminated with a check condition status.

2. If the data storage system is unable to formulate a response and return the requested inquiry data, a check condition status is returned.

3. If the inquiry data changes for any reason since the last time an initiator, like the host, has issued an inquiry command, the data storage system establishes a "unit attention condition" so that a subsequently received inquiry command from that initiator results in a check condition status returned with additional information as may be encoded in additional byte(s) returned with the status indicating that the inquiry data has changed.

Based on the above, the SCSI standard specifies that a status code of good is returned with the response payload when responding to any inquiry command unless one of the three exceptions cited above occurs. In the case of the three exceptions, the status returned is alternatively required to be check condition with no response payload.

In an embodiment in accordance with techniques herein, the multipathing functionality as may be embodied in the driver described above may determine multiple paths to the same LUN using the information returned from the standard inquiry page 0 commands. An embodiment may insulate an application from the fact that multiple paths may be in use by presenting the application with a single device. The driver may then select a path for use with an I/O as described above should that device be accessible on multiple paths. Subsequently, as the number of paths and the availability of the paths may change over time, the application may also be unaware of such changes so long as at least a single path is available to the device.

At times, it may be desirable to indicate temporarily that a particular path is not to be used for I/Os directed to a particular device, such as a particular LUN. The path may be used for sending I/Os to other devices but it may be desirable to disable or render the path inactive for I/Os for the device. In this case, the device and path are healthy. However, the particular combination of device and path specify that the path is not to be used for I/O operations for the device. The path may be used in connection with other SCSI commands for the device, but not for I/O operations. The foregoing may be characterized as a passive or inactive state with respect to the path for the particular device. It may be desirable to transition into such a state with respect to the path for the device for a variety of different uses. Some examples are described in more detail in following paragraphs where it may be desirable to render a path as passive or inactive with respect to a particular device but not for other devices. Prior to discussing these examples of when it may be useful and desirable to set a path to such a passive state, techniques are described which provide for transitioning the path to the passive state from the host's point of view for the particular device.

What will now be described are techniques which provide for selectively transitioning a path to a passive state to render the path inactive with respect to performing I/O operations for a particular device.

As described above, a host may perform an expected sequence of commands issued to the data storage system for a LUN and one or more paths over which the LUN may be accessed as part of discovery processing. The data storage system may track and detect when such a sequence of commands has been received from the host for the LUN over each such path in order to determine when the host has completed path recognition for the LUN. For example as described above in one embodiment, a path to a LUN may be recognized by the host when the host has successfully completed execution of the SCSI commands transmitted over the path to the data storage system including the LUN: TUR, standard inquiry page 0, read capacity, mode sense, inquiry VPD page 0x83 and also possibly one or more other commands, such as the SCSI reservation registration command. It should be noted that the path for which recognition is performed is the path over which such commands are transmitted to the data storage system from the host (e.g. more generally to the target from the initiator). After the data storage system has detected successful completion of the expected sequence of commands from the host indicating path recognition, the data storage system may at any subsequent point in time transition the path for this LUN to the passive or inactive state.

As part of setting the path for the LUN into the passive state and communicating such a passive state to the host, the data storage system may execute code thereon which performs processing that will now be described to return appropriate responses to subsequent commands received from the host. Based on the responses and associated data received for these commands subsequent to completing path recognition, the host may determine the passive state of the path for the particular LUN. Once the data storage system has detected that the host has successfully executed the expected command sequence associated with path recognition, it may be desirable to set the path for the LUN into the passive state. At this point, the data storage system may wait for the next command or operation, such as the next SCSI command, received for the LUN on the path. For any I/O command received on the path directed to the LUN, the data storage system does not execute the I/O operations and returns an error or failure condition indicating that the I/O operation failed. For example, the data storage system may return a check condition status in accordance with the SCSI protocol indicating the I/O operation failure. At this point, the host, or more specifically the driver which may have facilitated transmission of the I/O operation, may perform processing to try and determine further information about the I/O failure. The host may issue an inquiry page 0 command, such as the standard inquiry page 0 command described above (e.g., page code field=0 and EVPD field=0 in SCSI command block). The host may issue this inquiry command in connection with performing a path test to the LUN to determine if the path to the device is good. In other words, the I/O failure may have been caused by more than one condition and the host may perform processing to try and assess the cause of the failure and state of the path, device, and the like. In response to the inquiry page 0 command, the data storage system may return a specially formed response payload and status for use in accordance with techniques herein where the payload and response are compliant with the SCSI standard and protocol.

The inquiry response payload has a format as described and illustrated in FIG. 7. The data storage system may return a response payload of varying length but no more than the size of the allocation length indicating in the standard inquiry page 0 command. In accordance with techniques herein, it may be determined where the device identifier is expected to be located within the payload response, such as at offset X within the payload. A size may be selected for the response payload so that the payload has a size which is less than X. In other words, the response payload has a size which is truncated to a length less than X so that the device identifier and any subsequently located information in accordance with the format of FIG. 7 is omitted due to the truncated length.

Figure 9:
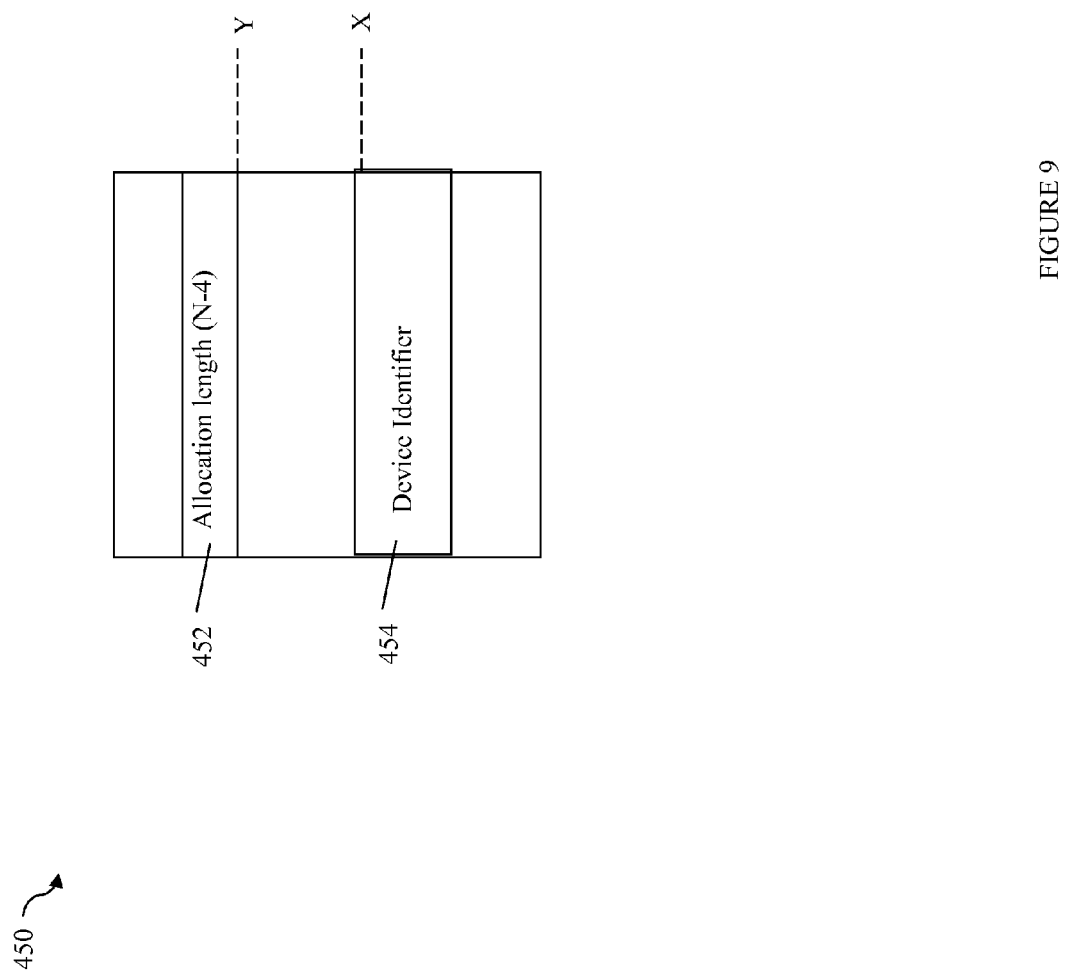
FIG. 9 is an example illustrating a special truncated response payload that may be used in an embodiment in accordance with techniques herein.

Reference is made to FIG. 9 to further illustrate the inquiry response payload just described. The example 450 includes an inquiry response payload in accordance with the format as described in FIG. 7 with the allocation length field 452. The field 452 indicates an amount of payload data which follows field 452. Element Y indicates that the field 452 ends at payload offset Y. It is noted that Y is byte offset 4 using a zero-based byte count for the format of FIG. 7. However, the variable Y is used as a more generalized representation. Element X indicates a location or offset as to where the device identifier 454 may be stored within the response payload in accordance with the format of FIG. 7. The location X may vary in accordance with the information used by each vendor in forming the device identifier and where such information is located in the response payload. In accordance with techniques herein, the data storage system may return a response payload having a total size or length in bytes which is more than Y and less than or equal to X, where X and Y are expressed in this example using a zero as the starting or first offset. In this case, the device identifier 454 is expected to be located beginning at offset X in the response payload. However, the actual payload size will not be large enough to include the device identifier thereby resulting in truncation of the device identifier and any expected information subsequent. It should be noted that the response payload may have to include the allocation length 452 in accordance with the current standard under consideration. To further illustrate with reference to FIG. 7, assume the device identifier is expected in a response payload at byte offsets 100-104. In this case, the data storage system may return a response payload having a size at least 5 bytes which is large enough to store data of bytes 0-4 and the total payload size may also be 100 bytes or less since the device identifier begins at byte offset 100 (e.g., the $101^{st}$ byte of the response payload). Thus, a response is returned having a payload which is truncated at an offset prior to that at which the device identifier is expected in accordance with the response payload format.

It should be noted that whether or not the response payload is required to include the actual length may vary with the particular standard. For example, an embodiment in accordance with techniques herein may use a command other than SCSI inquiry command, may be in accordance with another standard or protocol than as described herein, and the like.

It should be noted that in an embodiment in which the device identifier is based on multiple fields of data which may not be stored in consecutive locations in accordance with the format of FIG. 7, the value of X may be determined with respect to the location of the first of such multiple fields.

In addition to returning a special response payload that is truncated as described above, the inquiry response status indicates a good status. Upon receiving an inquiry response payload which has been truncated as described herein (e.g., truncated at an offset or location prior to that at which the device identifier is expected in accordance with the response payload format) in combination with the good status indicating that the path to the device is good, the host may determine that the path for the LUN is in a passive state. In one embodiment, the driver may receive the foregoing truncated inquiry response payload and good status following an I/O failure. At this point, the driver may determine the path to have a passive state setting and, assuming the LUN is recognized and available on multiple paths, just use a different path for directing I/Os to the LUN. The driver may then also attempt to issue the I/O to the LUN on a different path and this I/O operation may execute successfully. If an application has issued the I/O, the driver may determine the path for the particular LUN to be in the passive state and simply use an alternative path for I/Os for the LUN. Thus, the application does not receive an I/O failure, a false indication that the device or LUN is bad, and the like.

At a later point in time, the data storage system may set the state of the path for the LUN from passive to active and no longer return the specially formed inquiry response and status indicating that the path may again be used for I/Os directed to the LUN. The driver may at various times perform processing to determine whether the state of the path for the LUN has transitioned from passive to active. Such processing may include reperforming a path test. In one embodiment, the path test may include sending the standard inquiry page 0 command to see whether special formed response payload and good status are received. If the inquiry response payload is truncated and status is good as described in connection with the techniques herein, the host may determine that the particular path is in the passive state with respect to transmissions directed to the LUN. If the inquiry response payload is not truncated as described herein, the host may determine that the path is no longer in the passive state and is now in the active state. The host may optionally, perform other processing such as attempting to resend an I/O directed to the LUN on the path.

It should be noted that the determination of when a device is established or recognized on a particular path may be made which respect to any sequence of expected commands. After such commands have been successfully executed as detected by the data storage system, the data storage system may determine that the host and driver have recognized the path for the LUN. At any point subsequent to path recognition for a LUN, the data storage system may set the path for the LUN to the passive state. In this state, any subsequent I/Os which are directed to the LUN and transmitted over the path result in a response to the host indicating I/O failure. Additionally, the data storage system also responds to any standard inquiry page 0 commands with the specially formed response payload (e.g having the truncated length which is less than the location or offset at which the device identifier is expected) and good status. When the data storage system decides to transition the path for the LUN out of the passive state, the data storage system may cease sending the specially formed response to the inquiry command and may no longer automatically fail all I/O operations received on the path for the LUN.

By waiting to transition the path for the LUN to passive state until after path recognition, the host may perform subsequent processing to retry the path at a later point in time to detect the transition out of the passive state to another state, such as the active state, where the path may again be used for sending I/Os to the LUN. As described elsewhere herein in more detail in an embodiment in accordance with techniques herein, once the driver on the host successfully completes path recognition, the driver, such as a multipathing driver, may periodically either attempt to send an I/O operation on the path or otherwise peform a path test for the path. However, if the path is never successfully recognized, the driver might not try to send an I/O operation or perform a path test again without some manual intervention to configure new paths. Thus, by waiting until after successful path recognition, an embodiment in accordance with techniques herein may assure that the driver automatically detects a state change of no longer passive without requiring human intervention.

Figure 10:
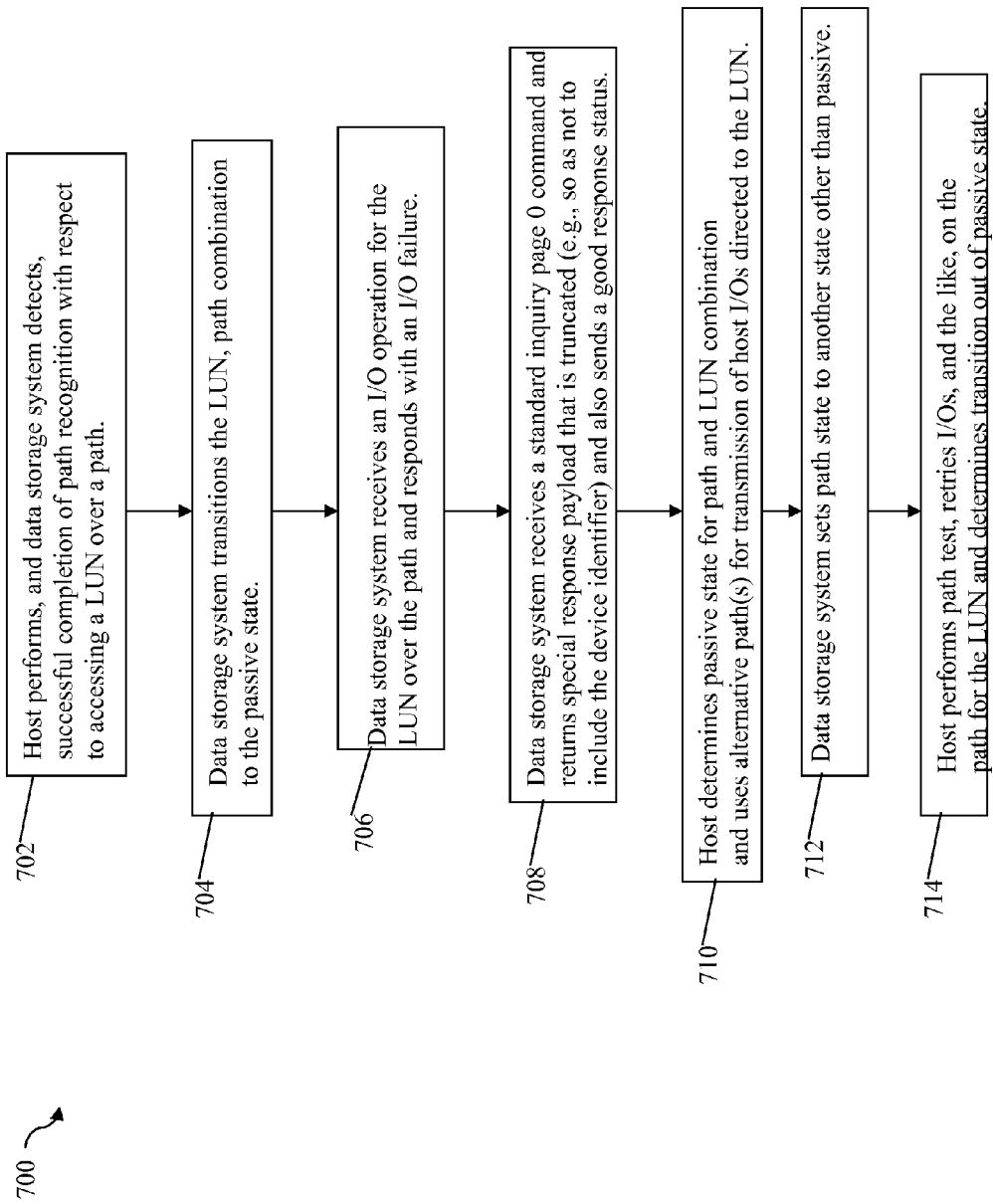

Referring to FIG. 10, shown is a flowchart of processing steps as may be perform in an embodiment in accordance with techniques herein. The flowchart 700 summarizes processing described above. At step 702, the host performs, and the data storage system detects, successful completion of path recognition with respect to accessing a LUN over a path. As described above, the completion of path recognition may be based on detecting successful completion of a sequence of one or more expected commands issued by the host to the data storage system where such commands are those taken to recognize or establish a path for a particular LUN. At step 704, the data storage system may transition the path for the particular LUN to the passive state for any one or more different reasons and uses as may occur in an embodiment in accordance with techniques herein. At step 706, the data storage system receives an I/O operation for the LUN over the path and responds with an I/O failure. At step 708, the data storage system receives a standard inquiry page 0 command and returns the special response payload as described above that has a truncated length so as to truncate the message prior to the expected location or offset of the device identifier. The data storage system also sends a good response status indicating that the path is good. At step 710, the host determines the path to be in the passive state for the LUN and path combination based on the received response to the standard inquiry page 0 command. Some point in time later, step 712 may be performed where the data storage system sets the path state for the LUN to a state other than passive such as active allowing I/Os for the LUN on the path. At step 714, for the path previously determined as passive with respect to the LUN, the host may perform a path test (e.g. issue another standard inquiry page 0 command), retry sending I/Os over the path, and the like. The data storage system does not currently respond with failing the I/Os and does not return the special truncated payload in response to the standard inquiry page 0 command. Thus, the host determines the path to be active thereby determining the transition of the path for the particular LUN out of the passive state based on the status and response(s) received (e.g., based on receiving a response payload other than the special truncated payload, successful completion of I/Os for the device when sent on the path, and the like).

Although the foregoing is described with purposes of illustration with respect to the SCSI standard and particular commands thereof, LUNs, and the like, the techniques herein are more generally applicable for use with other standards and protocols, commands, logical devices, and the like.

It should be noted the representation of a passive state as described herein with respect to a combination of path and LUN may be communicated from the data storage system to the host or other initiator in a different manner such as, for example, in accordance with the ALUA. (Asymmetric Logical Unit Access) portion of the SCSI standard. However, the techniques herein may be used in an embodiment which does not support ALUA.

Some examples will now be described of when it may be desirable to render a path as passive or inactive with respect to a particular device but not for other devices in an embodiment in accordance with techniques herein.

In following paragraphs, techniques are described which utilize setting a path, or more specifically, all paths including a particular target port of the data storage system, to the passive state with respect to a particular device in connection with redistributing the I/O workload for the device received at the particular target port to another target port over which the device is also accessible. Thus, such techniques provide for use of the passive state to cause the host to respond by reissuing failed or rejected I/Os (which are initially directed to the device on a path having the passive state) on another path in the active state whereby the device is configured as available on multiple recognized paths having different target ports.

With respect to a data storage system, multi-tenancy (MT) may be defined as multiple data storage system clients or tenants each having their own data stored on the data storage system. Thus, each of the multiple tenants may have their own data stored on devices, such as one or more LUNs, used by each such tenant. Additionally, all such tenants of the data storage system share the same data storage system infrastructure and resources. For example, a tenant or client may be a host, an application executing on a host, and the like. Each such client may store its data on a set of one or more LUNs. Data of the LUNs of the various clients may be accessed through one or more of the same data storage system ports, such as FA ports.

Figure 11:
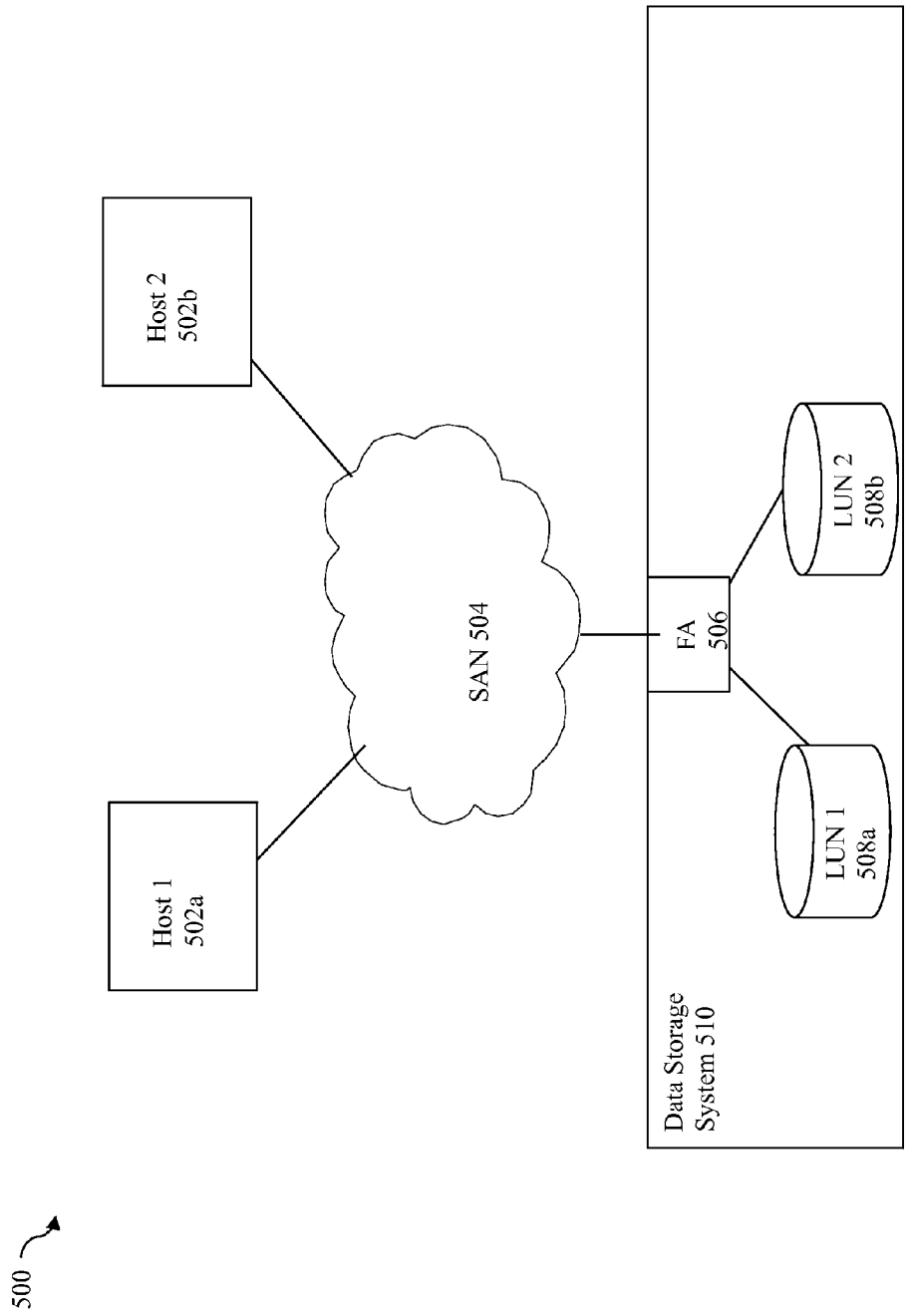
FIGS. 11, 14, 15 and 17 are examples of systems that may utilize techniques described herein.

Referring to FIG. 11, shown is an example of a system 500 in an embodiment in accordance with techniques herein. The example 500 includes two hosts 502a-b which communicate with data storage system 510 over SAN 504. The data storage system 510 may include FA 506 having a single port and storage provisioned for two LUNs 508a-b. It should be noted that the use of a single FA with one port, two hosts, two LUNs, and the like, are for purposes of simplicity of illustration. Host1 502a may access LUN 1 508a over SAN 504 through a port of FA 506. Host2 502b may access LUN 2 508b over SAN 504 through a port of FA 506.

In one embodiment to partition resources of the data storage system among multiple tenants, or more generally, among the multiple devices (such as LUNs) that may be accessed by different clients through the same FA port, quotas may be specified. A quota may be specified for each LUN accessible over a particular port to thereby partition or allocate front end port resources for use among the multiple LUNs and their associated clients which access such LUNs. The quota may be measured in I/O operations per second (IOPS) or in terms of data throughput (e.g., megabytes per second) or using any other appropriate metric. For the discussion herein, IOPS will be used for illustration purposes, but it should be understood that throughput or some other appropriate measure may be used instead. In this manner, a quota may be specified per device, per data storage system port over which the device's data is accessible to a client. For example, with reference to the example 500, a first quota, such as 50 IOPS, may be specified for LUN 1 with respect to FA 506 thereby indicating that a maximum of 50 IOPS directed to LUN 1 may be received at FA 506. A second quota, such as 30 IOPS, may be specified for LUN 2 with respect to FA 506 thereby indicating that a maximum of 30 IOPS directed to LUN 2 may be received at FA 506.

It should be noted that the quotas may be imposed as a maximum number or upper bound on the number of I/Os that are executed per second at each point in time. During a single time period, such as a one second time period, it may be the case that an actual number of I/Os directed to a particular LUN (such as LUN 1) through a particular port (such as through FA 506) may not exhaust the entire specified quota (such as 50 IOPS). In this case, a quota-based credit may be provided for the LUN accessed through the particular port of any unused quota whereby such quota credit may be applied, in whole or in part, to one or more subsequent time periods. The particular amount of credits applied to one or more subsequent time periods, such as subsequent one or more seconds, may vary with embodiment and may generally be any suitable technique. Additionally, it should be noted that any I/O which is not executed when received may be placed in an I/O queue to await servicing in a next subsequent time period. An embodiment may have such an I/O queue at each FA port for each LUN to which I/Os are added. Each I/O queue (maintained at each port for each LUN visible through the port) may have a maximum capacity or size. The length of an I/O queue at a point in time referring to the number of I/Os received at the port and awaiting servicing may be referred to as the queue depth.

It should be noted that an embodiment may also specify quotas on a per storage group (SG) basis. A SG may be defined as a logical grouping of one or more LUNs. An SG may be defined, for example, as a logical entity including the one or more LUNs used by a particular client, such as a particular application executing on a host. For example, multiple LUNs may be accessed by an application executing on Host 1 502a whereby such LUNs may be included in storage group 1 (SG1) and all LUNs of SG1 may be accessible through FA 506. In such an embodiment in which a single quota may be specified for an SG for FA 506, the SG1 quota limit may be partitioned in any suitable manner among the different LUNs of the SG. For example, one embodiment may equally partition the SG-based quota among the different LUNs of the SG to specify a per LUN quota for the FA 506.

Figure 12:
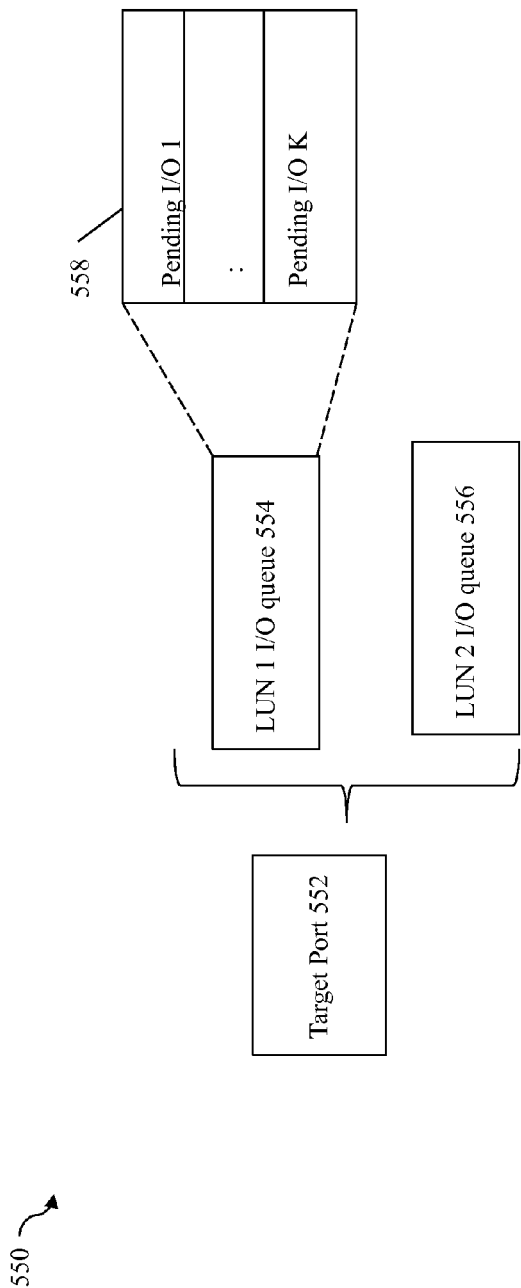
FIG. 12 is an example of pending I/O queues that may be used in an embodiment in accordance with techniques herein.

Referring to FIG. 12, shown is an example illustrating the I/O queues that may be maintained and used in an embodiment in accordance with techniques herein. The example 550 illustrates the two I/O queues 554, 556 that may be included in an embodiment for a single target port 552 of the data storage system, such as a target port of the FA 506 of FIG. 11. Element 558 illustrates in more detail a queue of pending I/Os received at the data storage system at target port 552 directed to LUN 1. Although not illustrated, in a manner similar to that as described in connection with 554, element 556 may also include entries for the pending I/Os received at target port 552 directed to LUN 2.

Figure 13:
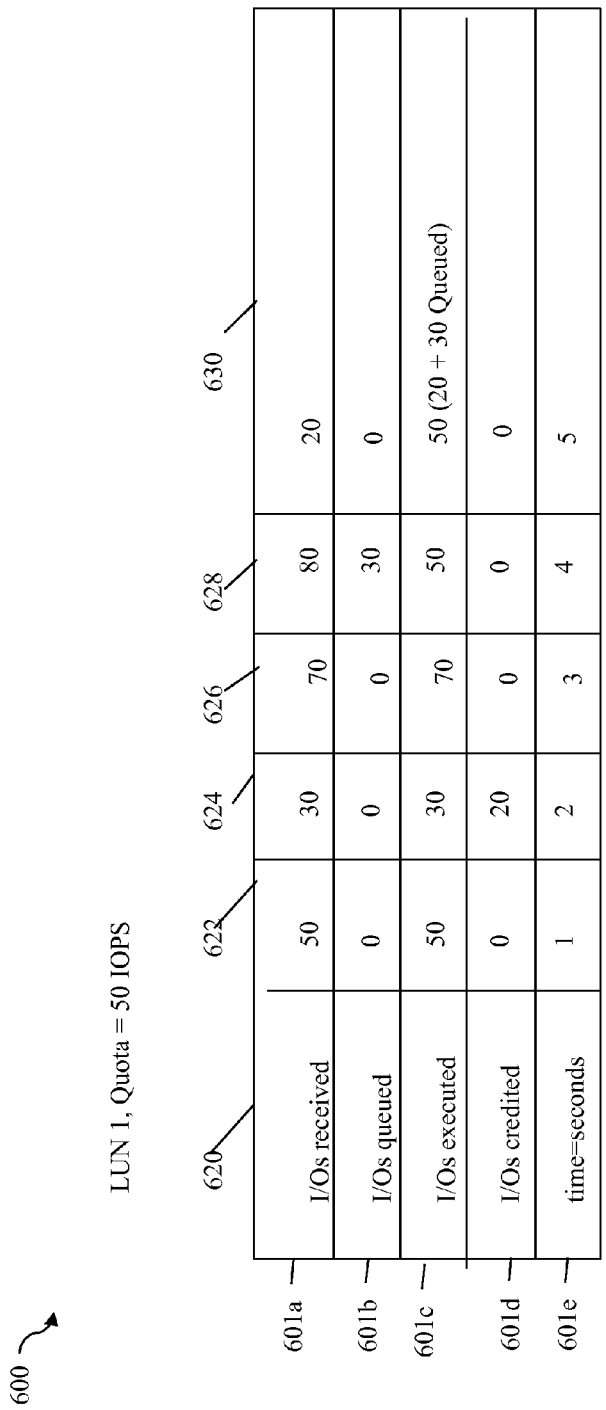
FIGS. 13 and 16 are examples illustrating information that may be obtained in connection with I/Os received at a target port where the I/Os are directed to a device in an embodiment in accordance with techniques herein.

With reference to FIG. 13, shown is an example 600 of a table illustrating various amounts of I/Os received, queued, executed and credited for various time periods in an embodiment in accordance with techniques herein. The example 600 illustrates exemplary values in connection with I/Os received in connection with LUN 1 through the target port of FA 506 having a quota of 50 IOPs. The example 600 includes a column 620 identifying the information included in each of the rows 601a-e of the table. Elements 622, 624, 626, 628 and 630 provide exemplary values at a series of 5 second time intervals. Row 601a identifies the number of I/Os received at different one second time intervals. Row 601b identifies the number of I/Os queued (current queue depth) at different one second time intervals. Row 601c identifies the number of I/Os executed at different one second time intervals. Row 601d identifies the number of I/Os credited, or accumulated I/O credit, at different one second time intervals. An I/O credit in a time N denotes an unused portion of I/O quota from the current time period N (and possibly prior time periods <N) whereby the I/O credit is carried forward and may be applied in subsequent time periods >N. The particular technique used to determine the accumulated I/O credit may vary with embodiment. For example, one embodiment may decrease the value of an I/O credit, such as using a time-decaying value, the further forward in time the I/O credit is carried. An I/O credit representing an amount of unused I/O quota from time interval N may also expire or have a maximum time window within which such unused I/O credit has to be used or otherwise is lost. The cumulative value of the I/O credit at a point in time may be comprised of unused I/O quota portions from multiple previous time periods. In this case, the foregoing techniques regarding the expiration time or decreasing the I/O credit may be applied collectively to the entire accumulated I/O credit or may otherwise be applied individually to the different unused I/O quota portions. Thus, the I/O credit at time N may represent an accumulated credit in response to a rate of I/O operations received at a one second time period being less than the quota. The credit may be decreased if an I/O operation is performed when the quota is exceeded. The credit may not be increased beyond a maximum value. Row 601e identifies the elapsed time in seconds for each one second time interval.

At a first point in time, t=1 second, column 622 indicates that 50 I/Os are received at FA 506 directed to LUN 1. Since the number of I/Os received does not exceed the 50 IOPS quota, all 50 I/Os received are executed at t=1 second. At a second point in time, t=2, column 624 indicates that 30 I/Os are received at FA 506 directed to LUN 1. Since the number of 30 I/Os received does not exceed the 50 IOPS quota, all 30 I/Os received are executed at t=2 seconds. Additionally, since 20 IOPs of the allocated 50 IOPS quota is unused at t=2, the 20 IOPs is an I/O credit. In this particular example, the 20 IOPs credit may be carried forward in full for use in the next time period, t=3 seconds, if needed. At the third point in time, t=3, column 626 indicates that 70 I/Os are received at FA 506 directed to LUN 1. At t=3, 70 I/Os are executed due to the I/O quota of 50 IOPS and the additional I/O credit of 20 from t=2. As denoted in 626, the balance of I/O credit at the end of t=3 is zero (0). At a fourth point in time, t=4, column 628 indicates that 80 I/Os are received at FA 506 directed to LUN 1. Since the number of 80 I/Os received exceeds the 50 IOPS quota, 50 I/Os received are executed at t=4 seconds with the remaining 30 I/Os being queued. At a fifth point in time, t=5, column 630 indicates that 20 I/Os are received at FA 506 directed to LUN 1. At t=5, 50 I/Os are executed including the 30 queued I/Os (from t=4) and the newly received 20 I/Os (from t=5).

Although not illustrated, values as denoted in the example 600 may also be tracked and used in connection with I/Os received at the target port of FA 506 for LUN 2.

In connection with determining which I/Os during a time period to execute, such as when there are queued I/Os and also received I/Os, an embodiment may assign a relative age to both the queued I/Os and also the newly received I/Os such that I/Os are executed in accordance with oldest to youngest (or most recently received). An embodiment may also track which queued I/Os have an age exceeding some predefined maximum age or time period after the I/O may be removed from the pending I/O queue and for which a message may be returned to the host to retry or reissue the removed I/O.

In a data storage system, there may be front-end port overprovisioning whereby the sum or total of the various I/O quotas assigned to each device accessible over the port exceed the maximum capability or limit of the FA port. For example, with reference back to FIG. 11, consistent with the example noted above, FA 506 may be single port having a maximum I/O capacity of 60 IOPs and where the I/O quota for LUN 1=50 IOPS and the I/O quota for LUN 2=30 IOPS. Based on the foregoing I/O quotas totaling 80 IOPS (e.g., 50 IOPS+30 IOPS) and the maximum I/O capacity of the port=60 IOPS, overprovisioning is implemented for FA 506. Overprovisioning is based on the assumption that, at a same point in time, the port will not be used by all devices accessible through the port at their maximum specified I/O quotas. For example, the assumption is that actual I/Os will not be issued to FA 506 at the same point in time at a rate of 50 IOPS for LUN 1 and 30 IOPS for LUN 2. Thus, overprovisioning may be characterized as assuming the following as represented by EQUATION 1:

$$\text{Sum of I/O quotas for PORT N} > \text{MAX CAPACITY PORT N} \quad \text{EQUATION 1}$$

where

"Sum of I/O quotas for PORT N" represents the sum or total of I/O quotas for all devices (e.g., LUNs) accessible over PORT N; and "MAX CAPACITY PORT N" represents the maximum capacity, limit, or bandwidth of the port, such as the maximum number of IOPS that the port is physically capable of processing.

Based on the above, I/Os directed to a LUN at a particular port may be queued and not executed during a time period if the particular LUN's I/O quota, along with any possible I/O credits, would be exceeded. Additionally, even if no I/O quota for a LUN at a port is exceeded, I/Os directed to a LUN at a particular port may be queued and not executed during a time period if the port's maximum capacity or limit would also be exceeded.

Thus, even without devices (e.g. LUNs) nearing their respective I/O quota maximums, it may be that at a point in time the port will receive enough actual I/Os to reach or exceed the port maximum capacity or limit. Since the same device may be mapped or accessible through multiple different data storage system front end ports, it may be that certain data storage system ports are very busy while others are not. A port receiving IOPS at a rate exceeding the port maximum capacity or limit may queue such I/Os in a manner as described herein when a LUN's I/O quota at a particular port is exceeded.

As described herein, any queued I/Os wait for processing in a subsequent time period thereby increasing the issuing client (e.g., application or host) response time. It may be understood that when a client, such as an application, issues IOPS at a rate exceeding its I/O quota will result in delays in I/O processing and increased I/O response times. However, when a port nears its maximum capacity or limit, received I/Os at the port of the data storage system are also queued even though none of the devices may have reached their respective I/O quotas.

Figure 14:
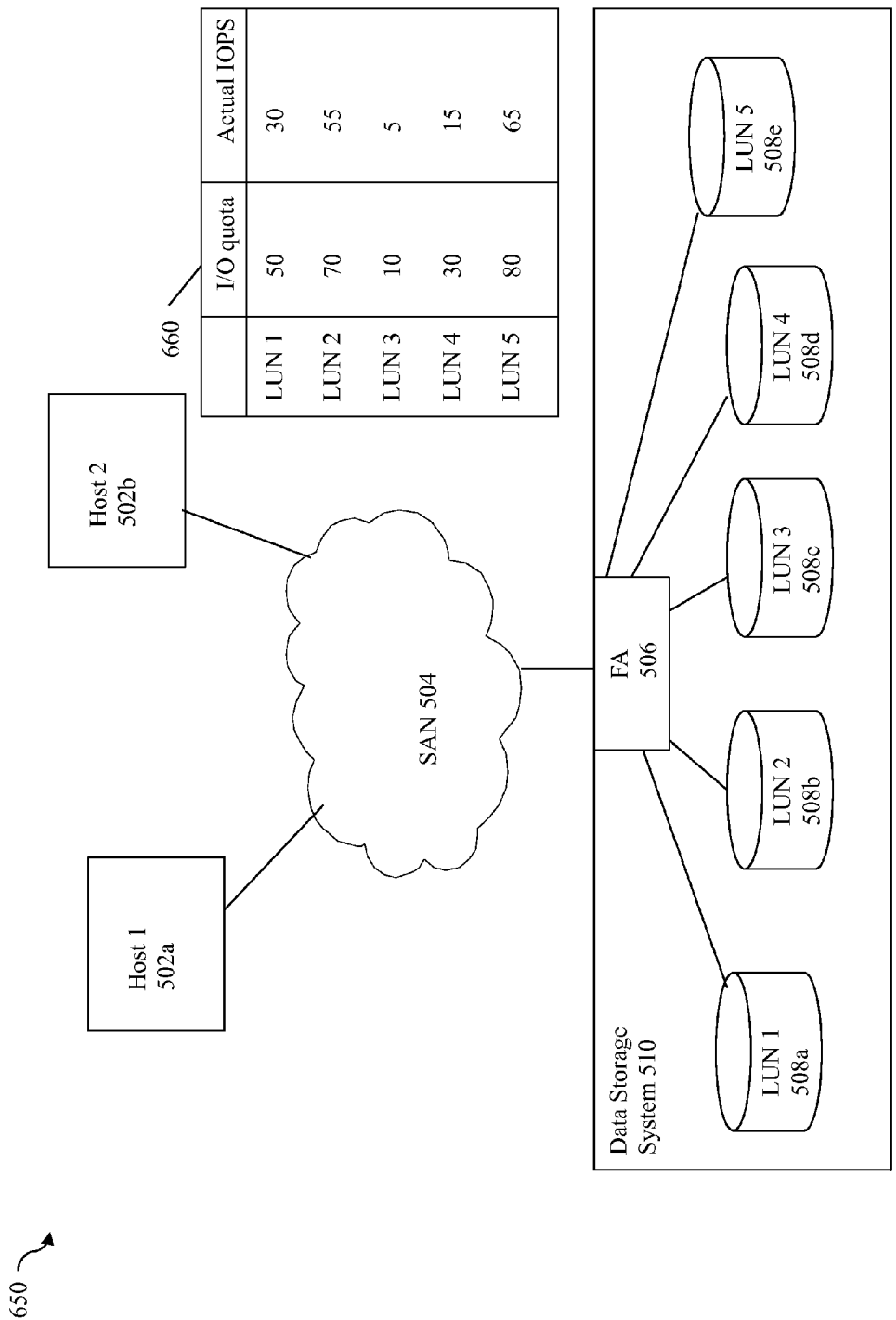

For example, reference is now made to FIG. 14 in the example 650 which is an expansion of the prior example 500. In the example 650, components are as described in the example 500 with the difference of 3 additional LUNs— LUNs 3, 4, and 5—which are accessible through FA 506, and with the addition of table 660. In the example 650, 5 LUNs 508a-e are accessible over FA 506 to the hosts 502a-b. Table 660 lists the various I/O quotas and actual IOPS received at a time period for the different LUNs. In this example, the maximum capacity or limit of the port of FA 506 may be 100 IOPS. As can been seen from the table 660, no single LUN has fully utilized its maximum allowable I/O quota yet I/Os will be queued since the aggregate sum of actual IOPs of 170 IOPS exceeds 100 IOPS, the maximum capacity or limit of the port. Thus, an application sending I/Os to one or more LUNs, whereby such I/Os are queued due to exceeding the maximum capacity of the port, will have an increase in its application response time even though the current actual IOPS directed to each such LUN may not be at, or even within some specified threshold of, the LUN's I/O quota.

What will now be described are techniques that may be used in connection with overprovisioning, such as when the total actual rate of I/Os received at a port (e.g., IOPS directed to all LUNs accessible over a port) exceeds the maximum capacity of that port. As described in following paragraphs, selected ones of the overprovisioned I/O quotas for associated LUNs may be redistributed to one or more other ports having unused capacity. The foregoing is possible for such associated LUNs which are accessible over multiple data storage system target ports whereby the workload for the LUN is redistributed from a first port to a second port (having available unused capacity) where the LUN is accessible over the first and second ports. The first port may, for example, have a total of actual IOPS for all LUNs accessible through the first port at, near or exceeding the first port's maximum capacity. The second port may have unused I/O capacity in that the total actual IOPS for all LUNs accessible through the second port may be less than the second port's maximum capacity. The difference between the second port's maximum capacity and the total actual consumed IOPS of the second port may be above some minimum threshold. Thus the minimum threshold denotes a minimum available or unused amount of the resource, the second port's maximum capacity.

More generally, techniques herein provide for redistributing I/O workload from a first busy port to a second "less busy" port having unused, available capacity to handle additional I/O workload. Various criteria may be used within an embodiment, for example, to determine which one or more ports are sufficiently "busy" to have at least some of their I/O workload redistributed to another port of the data storage system, to determine which one or more ports have a sufficient amount of unused or available workload capacity to accept a redistributed workload, and the like. Some examples are provided herein although generally an embodiment may use any suitable criteria.

Figure 15:
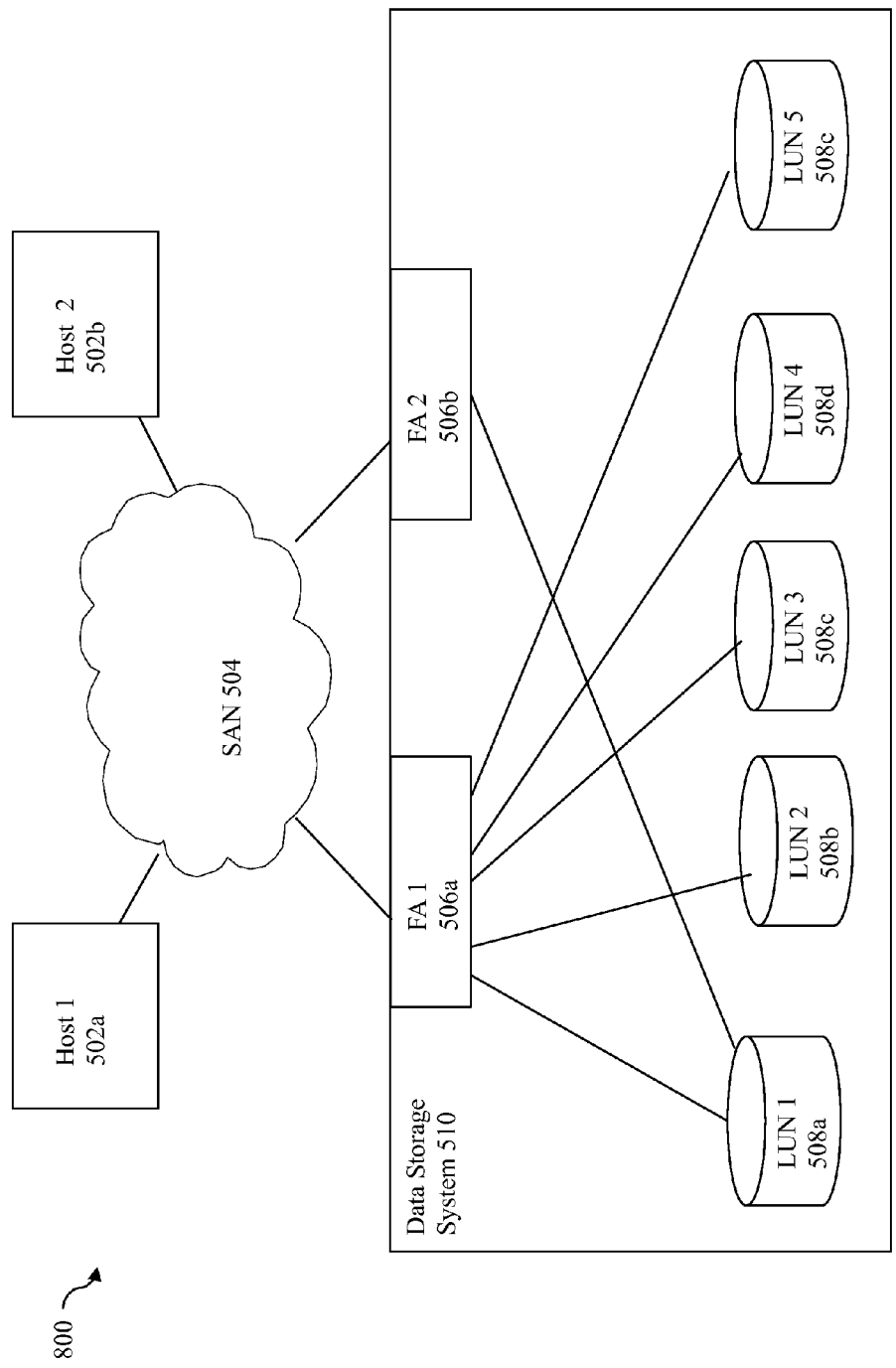

Referring to FIG. 15, shown is an example 800 illustrating components that may be included in an embodiment in accordance with techniques herein. The example 800 includes components similar to those described in connection with other figures. The example 800 includes hosts 502a-b, SAN 504 and data storage system 510 as described above. In this example, the data storage system 510 includes two FAs 506a-b each having a single port. 5 LUNs 508a-e are visible or accessible to the hosts over the port of FA 1 506a. A single LUN, LUN 1, is visible or accessible to the hosts over the port of FA 2 506b. In some embodiments, not all LUNs are accessible over all data storage system ports.

Figure 16:
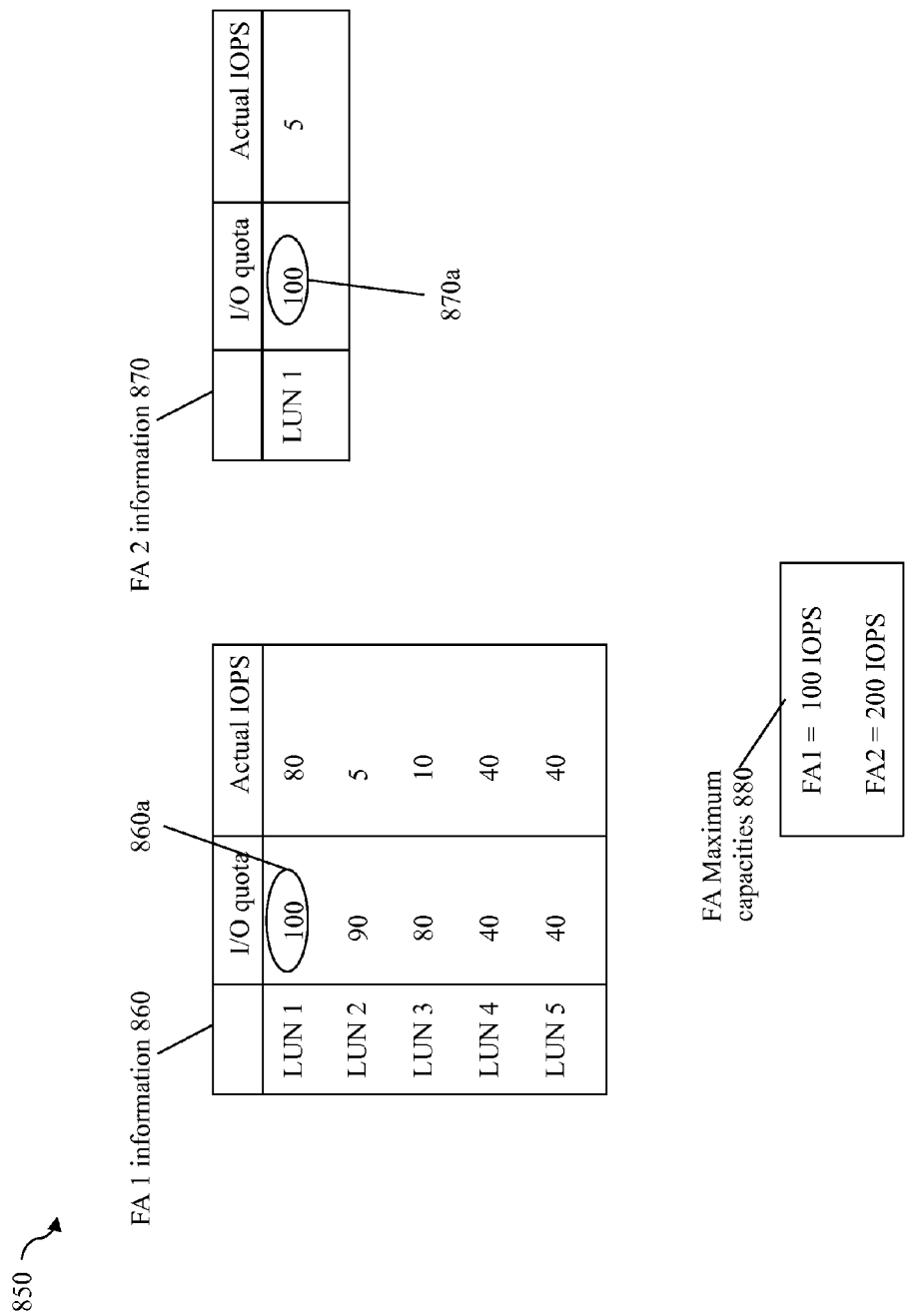

Referring to FIG. 16, shown is an example 850 of information used in connection with a data storage system in an embodiment in accordance with techniques herein. The example 850 includes a first table 860 of information for a first port, FA1 506a of FIG. 15, a second table 870 of information for a second port, FA2 506b of FIG. 15, and a third table 880 denoting the maximum capacities in terms of IOPs for the data storage system front end ports of the FAs 506a-b of FIG. 15. The table 860 denotes the various I/O quotas and actual IOPS observed at a time period for each LUN accessible over port FA1 506a. The table 870 denotes the I/O quota and actual IOPS observed at a time period for the single LUN 1 accessible over port FA2 506b. The table 880 denotes that port FA1 506a has a maximum capacity of 100 IOPS and that FA2 506b has a maximum capacity of 200 IOPS.

Based on the foregoing with reference to FIGS. 15 and 16, the current actual IOPS for the first port FA1 506a exceeds the first port's maximum capacity of 100 IOPs. Additionally, the current actual IOPS for the second port FA2 506b does not exceed the second port's maximum capacity of 200 IOPs whereby the second port FA2 506b has an unused IOPS capacity of 195 IOPS.

In accordance with techniques herein, processing may be performed in the data storage system to monitor observed actual IOPS for each of the FAs or front end ports, such as 506a-b. Based on one or more criteria for determining overburdened, overutilized or "busy" ports, it may be determined that FA1 506a is "busy" whereby some of its I/O workload may be redistributed to another second port having unused available capacity to perform additional I/O workload. Criteria used to determine a "busy" port may include that as expressed using the following equation:

$$\text{Sum of actual IOPS received at PORT N for time period } M > \text{MAX CAPACITY PORT N} \quad \text{EQUATION 2:}$$

where

"Sum of actual IOPS received at PORT N for time period M" represents the sum or total of actual IOPS for all devices (e.g., LUNs) accessible over PORT N in a given time period; and "MAX CAPACITY PORT N" represents the maximum capacity or limit of the port, such as the maximum number of IOPS that the port is physically capable of processing. It should be noted that the time period M over which the sum of actual IOPS received at port N exceed port N's maximum capacity may vary with embodiment. For example, it may be determined that the sum of the actual IOPS received at port N exceed the port's maximum capacity a threshold number of seconds whereby "threshold number of seconds" may represent the amount of time after which a host may timeout or retry the I/O. An embodiment which tracks the age of queued I/Os as described elsewhere herein may determine whether the sum of the actual IOPS received at port N exceed the port's maximum capacity for a time duration exceeding the "threshold number of seconds", for example, by tracking the age of the oldest pending queued I/O.

Other criteria used to determine a "busy" port may be based on the overall average queue depth of all queued pending I/Os for all LUNs at each port. For example, in a data storage system including 4 target ports (e.g., ports 1-4) over which LUNs are accessible, a first average queue depth of pending I/Os for all LUNs accessible over port 1 may be determined, a second average queue depth of pending I/Os for all LUNs accessible over port 2 may be determined, a third average queue depth of pending I/Os for all LUNs accessible over port 3 may be determined, and a fourth average queue depth of pending I/Os for all LUNs accessible over port 4 may be determined. Such average I/O queue depth for each port may be monitored or observed for a time period and if the port's average pending I/O queue depth exceeds some predetermined threshold for some specified amount of time, the port may be characterized as "busy" (e.g., overutilized or overburdened) and workload may be redistributed from the "busy" port in accordance with techniques herein.

Once a "busy" port is selected, a determination is made regarding the particular I/O workload associated with one or more LUNs of the busy port to be redistributed (e.g. select one or more LUNs having their workload redistributed from the "busy" port to another port having available capacity wherein such LUNs are accessible over the other port).

With reference to FIGS. 15 and 16, an embodiment may select one or more LUNs having the highest actual observed IOPS whereby such selected one or more LUNs are also accessible over one or more other ports having available unused capacity to perform additional I/O workload. For example, LUN 1 has the highest actual IOPS=80 on port FA 1 506*a*, LUN 1 is also accessible over the port FA 2 506*b*, and FA2 506*b* has available capacity to perform additional IOPS or I/O workload of 195 IOPS. Thus, I/O workload for LUN 1 received at port FA1 506*a* may be redistributed to port F2 506*b*. Generally, the one or more LUNs selected may be determined as the "busiest" such LUNs whose workload can be redistributed. As just described, the criteria used to determine and select one or more LUNs having their workload distributed may include those one or more LUNs having the highest actual observed IOPS directed to the LUNs on the "busy" port. The criteria may also include, for example, examining the average queue depth of I/Os queued for each particular LUN. As described herein such as in connection with FIG. 12, each target port may include a separate I/O queue for each LUN accessible over the target port. The LUN's I/O queue associated with a target port may include a list of all I/Os received at the target port which are directed to the LUN and which are waiting to be serviced by the data storage system. The LUN selected may, for example, have an average I/O queue depth at the "busy" port which is the largest average I/O queue depth of all LUNs visible on the "busy" port. For example with reference to FIG. 12 assuming that target port 552 is selected as the "busy" port, the average queue depth of 554 and 556 may be monitored and the LUN selected to have its workload redistributed may have the maximum average queue depth of all such I/O queues 554, 556 associated the target port 552. As another example, one or more LUNs may be selected each having an average I/O queue depth on the "busy" port above a specified threshold average queue depth. As yet another example, an overall average queue depth for all such I/O queues associated with "busy" port may be determined. For example, an overall average queue depth may be expressed as the mean queue depth with respect to all I/O queues for all LUNs accessible over the "busy" port. The one or more LUNs selected may each have an average I/O queue depth greater than the overall average queue depth.

In accordance with techniques herein with reference to FIG. 15, the I/O workload for LUN 1 508*a* received at FA1 506*a* may be redistributed to FA2 506*b* by setting the state to passive for LUN 1 with respect to paths that include the target data storage system port FA 1 506*a*. Processing to set the foregoing passive state may be performed on the data storage system whereby the data storage system may drive the I/O redistribution processing in an embodiment in accordance with techniques herein. As described elsewhere herein, setting the passive state for LUN 1 over paths including the target port FA 1 506*a* result in I/O operations directed to LUN 1 which are received at FA 1 506*a* not being processed (e.g., for example, the data storage system may not service the I/O and may return a SCSI check condition). However, non I/O commands, or control commands, directed to LUN 1 which are received on the target port FA 1 506*a* may be processed. Additionally, consistent with other description herein, setting the passive state is done per device accessible over the target port of the data storage system. For example, LUNs 2-5 may each have an active setting with respect to paths including target port FA1 506*a* whereby both I/Os and control commands directed to LUNs 2-5 which are received at FA1 506*a* may be processed.

In connection with redistributing the workload for LUN 1 received at port FA1 506*a* to port F2 506*b* by setting paths to LUN 1 including port FA1 506*a* to a passive state, the I/O quota 860*a* for FA1 506*a* for LUN 1 may also be redistributed to FA 2 506*b* so that the I/O quota denoted by 870*a* may be updated from 100 IOPS to 200 IOPS.

Once the state of LUN 1 on port FA 506*a* is set to passive for any paths including FA 506*a*, any I/Os received from a host are failed and not processed. An error condition or message (e.g., SCSI check condition) may be returned to the requesting host issuing such I/Os to LUN 1 received at FA 506*a*. As a result, the host may use an alternative path which does not include the port of FA 506*a* for transmission of host I/Os directed to LUN 1. For example, the host may resend such failed I/Os and any subsequent I/Os directed to LUN 1 over a path including the alternate target data storage system port FA 2.

Thus, in accordance with techniques herein, a device, such as LUN 1, may be accessible to a host over multiple paths whereby such multiple paths have multiple different target ports of the data storage system. If a first of the target ports over which LUN 1 is accessible should be deemed "busy" or overloaded, and a second of the target ports over which LUN 1 is accessible is determined to have unused capacity to perform additional I/O workload, the data storage system may set all paths including the first target port for LUN 1 to passive. As described elsewhere herein, I/Os directed to LUN 1 which are received at the first port are failed and not processed. Responsive to failure of the data storage system to service such I/Os, the host may retry such failed I/Os and also send subsequent I/Os to LUN 1 over a path including the second target port.

By setting path(s) including the first port to passive for LUN 1, the workload received at the first port for LUN 1 will now redistributed to the second port (by the host issuing such I/Os directed to LUN 1 to the second port rather than the first port) thereby reducing the overall I/O workload for the first port. In one embodiment, it should be noted that once all paths including a particular data storage system target port, such as the first port, for a LUN are set to passive, any pending I/Os currently queued at the first port are failed or rejected by the data storage system. The data storage system may traverse the I/O queue and return an error or failure condition, such as SCSI check condition, to the host for such queued I/Os. The host will detect the passive state for such paths including the first port for the LUN and subsequently reissue the failed or rejected I/Os along with any other subsequent I/Os on a different path including the second port rather than the first port.

Figure 17:
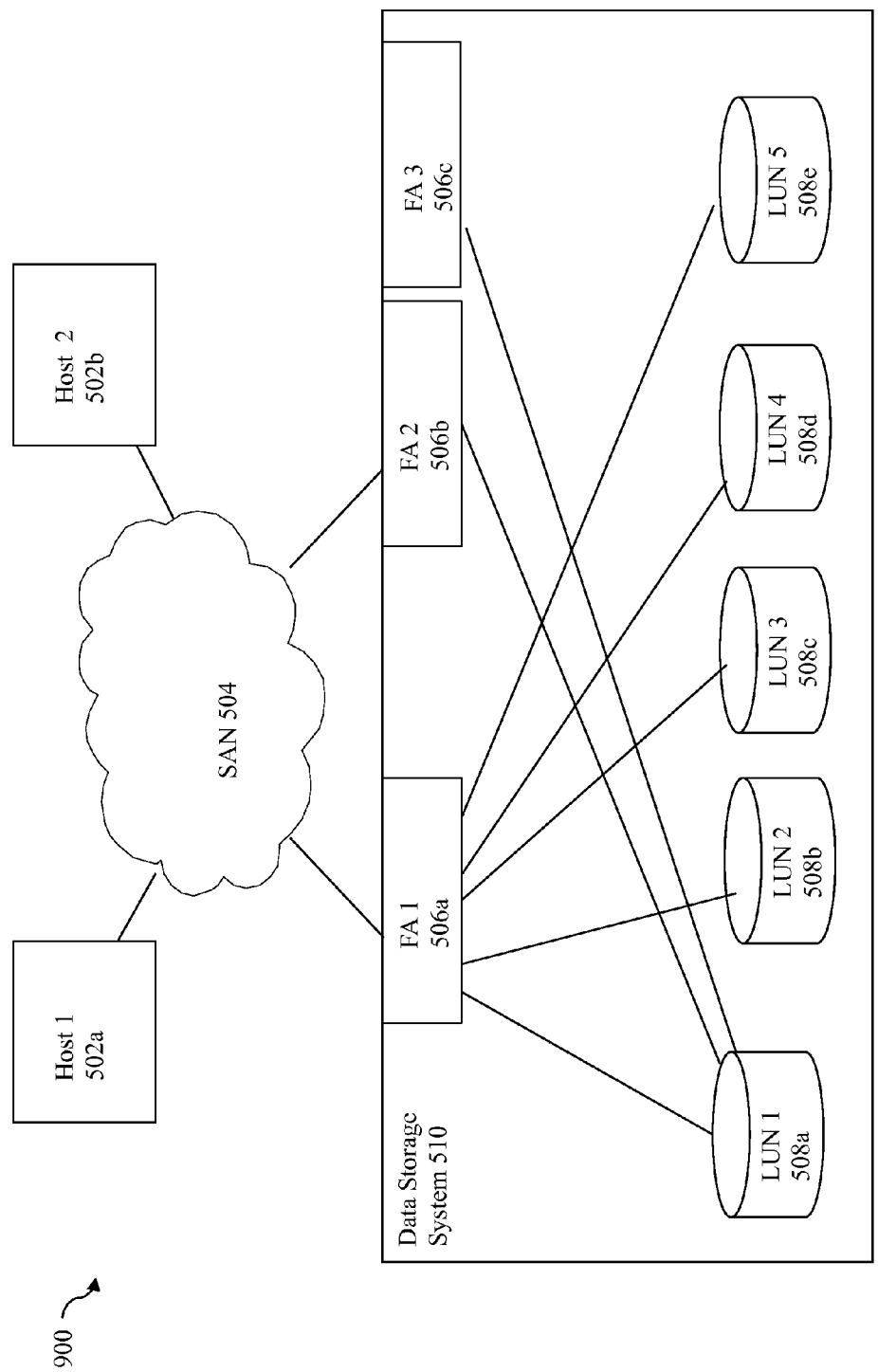

It should be noted that for simplicity of illustration, the example 800 includes only two target ports of the data storage systems. However, more generally, a data storage system including 3 or more target ports over which a same LUN is accessible may redistribute I/O quota from a first "busy" port (having its paths in the passive state) among one or more other target ports having unused or available capacity to perform additional I/O workload. For example, with reference to FIG. 17, shown is a modified version of example 800 of FIG. 15. The example 900 is as described in connection with the example 800 with the addition of a third target port FA3 506c on the data storage system whereby only LUN 1 is accessible over the third port 506c. The target port 506c may be similar to 506b having a maximum capacity of 200 IOPS, an I/O quota for LUN 1=100 IOPS and an actual IOPS of 5. As described above, the paths to LUN 1 including target port FA 1 506a may be set to passive on the data storage system. Additionally, the 100 IOPS quota for LUN 1 associated with 506a may be reallocated among the remaining ports FA2 506b and FA3 506c having active paths to LUN 1. For example, in one embodiment, the 100 IOPS may be partitioned equally among 506b and 506c making the I/O quota=150 IOPS for each 506b and 506c with respect to LUN 1. It should be noted that the I/O quota of 100 IOPS from 506a may be reallocated in any suitable manner and does not have to be partitioned in equal amounts among all other target ports over which the LUN 1 is accessible. More generally, such reallocation of the 100 IOPS may be in different or varying amounts to different target ports. Furthermore, the 100 IOPS may be reallocated among a selected one or more of the remaining target ports having available capacity for I/O workload rather than among all such target ports.

With reference back to the example 800, at a later point in time after setting all paths including FA 1 506a to passive for LUN 1, processing may be performed on the data storage system to transition the foregoing paths including the target port of FA 1 506a for LUN 1 from passive to active. Such processing to transition the paths from passive to active may be performed, for example, responsive to the workload of FA1 506a being reduced so that FA 1 506a is no longer considered "busy" and has a reduced workload (e.g., such as in accordance with "busy" criteria that may be specified in an embodiment). More generally, an embodiment may use any suitable criteria in connection with determining when to transition a path with respect to a device from passive to active.

Techniques herein may be characterized as dynamic in that paths including a particular "busy" target port of the data storage system for I/O directed to a particular LUN may be set to passive and/or active responsive to workload conditions in the data storage system that may change over time. Examples of various criteria are set forth herein for "busy" port determination, "busy" LUN determination, selection of one or more other target ports having available unused capacity and the like. An embodiment may use any one or more of the criteria described herein, alone or in combination with other suitable criteria.

Referring to FIG. 18, shown is a flowchart 1000 of processing that may be performed in an embodiment in accordance with techniques herein. The flowchart 1000 summarizes processing described above. At step 1002, a "busy" port is selected whereby workload is to be redistributed from the "busy" port. At step 1004, one or more receiving target ports of the data storage system are selected. The receiving ports have available or unused capacity to perform additional workload to be redistributed from the "busy" port. At step 1006, one or more devices are selected whereby the selected devices are accessible over both the "busy" port and the one or more received ports. The selected devices will have their workload redistributed from the "busy" port to the one or more receiving ports. At step 1008, the data storage system sets one or more paths including the "busy" port to passive for the selected one or more devices. Additionally in step 1008, the data storage system may reallocate the I/O quota for the selected devices at the "busy" port to the one or more receiving ports. At step 1010, any queued I/Os which were previously received at the "busy" port and which are directed to any of the selected one or more devices are rejected. At step 1012, the host determines or detects the passive state setting for the paths and selected devices and uses one or more alternative paths for transmission of host I/Os directed to the selected devices. At step 1014, at a later point in time, the data storage system sets the one or more paths including the "busy" port to active for the selected one or more devices. As described herein, step 1014 may be performed responsive to a determination by the data storage system that the current workload of the "busy" port has decreased. For example, step 1014 may be performed responsive to determining that the monitored actual total IOPS (e.g., for all LUNs) received at the "busy" port no longer exceeds the maximum capacity of the port whereby all received I/Os are being processed without requiring placement in the I/O queues due to the port's maximum capacity being exceeded. At step 1016, the host determines or detects the transition from the passive to the active state for the paths and selected devices. Subsequently, the host may now issue I/Os to the selected devices over the paths including the previously "busy" port.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for redistributing workload comprising:
   selecting a first port from which a first workload is to be redistributed;
   selecting a second port with available capacity to perform additional workload;

selecting a device accessible over both the first port and the second port; and setting each of one or more paths including the first port to a passive state for the device, wherein each of said one or more paths having the passive state for said device indicates to a client that sends I/O operations to said device that said each path is not to be used for sending I/O operations to said device and that said each path is available for use in performing control operations directed to said device, wherein a first plurality of devices, including the device, are accessible to the client over the first port, said first plurality of devices being associated with a plurality of quotas, and wherein said first port is over-provisioned having a maximum capacity that is less than a sum of the plurality of quotas.

2. The method of claim 1, wherein the first port, the second port, and the device are included in a data storage system.

3. The method of claim 1, wherein the device is accessible by a first host over a first path including the first port, and the device is accessible by the first host over a second path including the second port.

4. The method of claim 1, wherein the first port is selected in accordance with one or more criteria, said one or more criteria including any one or more of: whether an actual workload received at the first port for a time period exceeds the maximum capacity denoting a maximum workload capability of the first port, and whether an average pending I/O queue depth for all I/Os directed to the first port exceeds a threshold queue depth.

5. The method of claim 4, wherein the actual workload and the maximum capacity of the first port are expressed using any of a number of I/Os per unit of time and an amount of storage transmitted per unit of time.

6. The method of claim 1, wherein each device accessible through said first port has a pending I/O queue of I/Os whereby each I/O included in said pending I/O queue has been received at the first port, is directed to said each device and is waiting to be serviced.

7. The method of claim 6, wherein the device is selected in accordance with one or more criteria including any one or more of: whether an average pending I/O queue depth of pending I/Os received at the first port directed to the device is a largest such average queue depth with respect all pending I/O queues for devices accessible over the first port, and whether an actual workload received at the first port for a time period directed to the device is greater than any other actual workload that is received at the first port for a time period and directed to any other device accessible over the first port.

8. The method of claim 1, wherein an actual workload for the second port does not exceed a second maximum capacity denoting a maximum workload capability of the second port.

9. The method of claim 1, wherein a host determines that a first of the one or more paths including the first port is set to the passive state for the device, and, responsive to determining that the first path is in the passive state for the device, the host sends one or more I/Os directed to said device over another path including the second port.

10. The method of claim 9, wherein a data storage system includes the first port, the second port and the device, and the method further comprising:

sending, by the host to the data storage system, a first I/O to the device over the first path; and sending; by the data storage system to the host, a response to the first I/O denoting that said first I/O failed and will not be serviced.

11. The method of claim 1, wherein the available capacity of the second port is at least a minimum amount.

12. A method for redistributing workload comprising:

selecting a first port from which a first workload is to be redistributed;

selecting a second port with available capacity to perform additional workload;

selecting a device accessible over both the first port and the second port; and setting each of one or more paths including the first port to a passive state for the device, wherein each of said one or more paths having the passive state for said device indicates to a client that sends I/O operations to said device that said each path is not to be used for sending I/O operations to said device and that said each path is available for use in performing control operations directed to said device, wherein a first plurality of devices are accessible to a host over the first port, said first plurality of devices being associated with a plurality of quotas, a different one of the plurality of quotas being specified for each of the first plurality of devices, whereby each of said plurality of quotas specified for one of the first plurality of devices denotes an upper bound of actual workload allowable for said one device through said first port.

13. The method of claim 12, wherein a first sum is determined that is a sum of said plurality of quotas, and wherein said first sum exceeds a first maximum capacity denoting a maximum workload capability of the first port.

14. The method of claim 13, wherein a first actual workload received at the first port for a time period exceeds a maximum capacity denoting a maximum workload capability of the first port and wherein a first portion of the first actual workload representing an actual workload received at the first port directed to the device does not exceed one of the plurality of quotas specified for said device.

15. The method of claim 14, wherein a first I/O directed to said device is received at the first port prior to performing said setting when each of said one or more paths is in an active state with respect to said device thereby denoting that I/Os received on said each path which are directed to said device will be serviced, and wherein the first I/O is placed in a pending I/O queue associated with said device because the first actual workload received at the first port for a time period exceeds the maximum capacity denoting the maximum workload capability of the first port.

16. A non-transitory computer readable medium comprising code stored thereon for redistributing workload, that when executed, performs a method comprising:

selecting a first port from which a first workload is to be redistributed;

selecting a second port with available capacity to perform additional workload;

selecting a device accessible over both the first port and the second port; and setting each of one or more paths including the first port to a passive state for the device, wherein each of said one or more paths having the passive state for said device indicates to a client that sends I/O operations to said device that said each path is not to be used for sending I/O operations to said device and that said each path is available for use in performing control operations directed to said device, wherein a first plurality of devices, including the device, are accessible to the client over the first port, said first plurality of devices being associated with a plurality of quotas, and wherein said first port is over-provisioned having a maximum capacity that is less than a sum of the plurality of quotas.

17. A system comprising:
a host; and
a data storage system including:
- a first port from which a first workload is to be redistributed;
- a second port with available capacity to perform additional workload;
- a device accessible to the host over both the first port and the second port; and wherein the data storage system includes a processor which is programmed to and performs processing including:
- setting each of one or more paths including the first port to a passive state for the device, wherein each of said one or more paths having the passive state for said device indicates to the host that sends I/O operations to said device that said each path is not to be used for sending I/O operations to said device and that said each path is available for use in performing control operations directed to said device, wherein a first plurality of devices, including the device, are accessible to the host over the first port, said first plurality of devices being associated with a plurality of quotas, and wherein said first port is overprovisioned having a maximum capacity that is less than a sum of the plurality of quotas.

18. The system of claim 17, wherein the first port is selected in accordance with one or more criteria, said one or more criteria including any one or more of: whether an actual workload received at the first port for a time period exceeds the maximum capacity denoting a maximum workload capability of the first port, and whether an average pending I/O queue depth for all I/Os directed to the first port exceeds a threshold queue depth.

19. The system of claim 18, wherein the actual workload and the maximum capacity of the first port are expressed using any of a number of I/Os per unit of time and an amount of storage transmitted per unit of time.

20. The system of claim 17, wherein each device accessible through said first port has a pending I/O queue of I/Os whereby each I/O included in said pending I/O queue has been received at the first port, is directed to said each device and is waiting to be serviced.

* * * * *